United States Patent
Kawashita et al.

(10) Patent No.: US 7,751,690 B2
(45) Date of Patent: Jul. 6, 2010

(54) RECORDING AND REPRODUCING APPARATUS

(75) Inventors: Mitsuya Kawashita, Kanagawa (JP); Osamu Okada, Hyogo (JP); Nobuyuki Batou, Osaka (JP); Taku Yokawa, Hyogo (JP); Yoshikazu Ueta, Hyogo (JP); Hidenori Mitsunaga, Hyogo (JP); Takashi Kouno, Hyogo (JP)

(73) Assignees: Fujitsu Ten Limited, Kobe (JP); Fujitsu Limited, Kawasaki (JP)

( * ) Notice: Subject to any disclaimer, the term of this patent is extended or adjusted under 35 U.S.C. 154(b) by 1470 days.

(21) Appl. No.: 11/115,211

(22) Filed: Apr. 27, 2005

(65) Prior Publication Data

US 2005/0259972 A1 Nov. 24, 2005

(30) Foreign Application Priority Data

Apr. 28, 2004 (JP) .......................... P2004-134685

(51) Int. Cl.
*H04N 7/26* (2006.01)

(52) U.S. Cl. .......................... 386/109; 386/68; 386/98; 386/112; 386/124; 382/232

(58) Field of Classification Search ............... 360/72.1, 360/55; 386/46, 68, 98, 109, 112, 123–126; 382/232

See application file for complete search history.

(56) References Cited

U.S. PATENT DOCUMENTS

| | | | |
|---|---|---|---|
| 5,552,896 A * | 9/1996 | Yoshida | 386/105 |
| 5,748,332 A * | 5/1998 | Lee | 386/68 |
| 5,768,236 A | 6/1998 | Kihara | |
| 5,812,817 A * | 9/1998 | Hovis et al. | 711/173 |
| 5,914,941 A | 6/1999 | Janky | |
| 6,442,327 B1 * | 8/2002 | Yamada et al. | 386/46 |
| 2001/0000540 A1 | 4/2001 | Cooper et al. | |
| 2002/0052735 A1 * | 5/2002 | Nagano et al. | 704/207 |
| 2003/0147625 A1 | 8/2003 | Takada | |

FOREIGN PATENT DOCUMENTS

| | | |
|---|---|---|
| CN | 1312556 A | 9/2001 |
| DE | 100 53 732 A1 | 5/2001 |
| EP | 0 283 727 A2 | 9/1988 |
| EP | 0 957 489 A1 | 11/1999 |
| EP | 1 553 587 A1 | 7/2005 |
| JP | A 8-124302 | 5/1996 |
| JP | A 9-9193 | 1/1997 |
| JP | A-2001-195825 | 7/2001 |
| JP | A-2002-51308 | 2/2002 |
| JP | A 2002-203361 | 7/2002 |
| JP | A 2003-217265 | 7/2003 |
| JP | A 2003-228907 | 8/2003 |
| JP | A 2003-317385 | 11/2003 |

* cited by examiner

*Primary Examiner*—Thai Tran
*Assistant Examiner*—Mishawn Dunn
(74) *Attorney, Agent, or Firm*—Oliff & Berridge, PLC

(57) ABSTRACT

A recording and reproducing apparatus for reproducing information recorded on a recording medium concurrently while recording the information, includes a compression section, a temporary storage section, a reproducing process section, and a storage section. The compression section reads the information recorded on the recording medium and compresses read information. The temporary storage section stores compressed information provided by the compression process. The reproducing process section decompresses the compressed information output thereto from the temporary storage section and reproduces decompressed information. The storage section stores the compressed information output thereto from the temporary storage section.

22 Claims, 18 Drawing Sheets

FIG. 6A
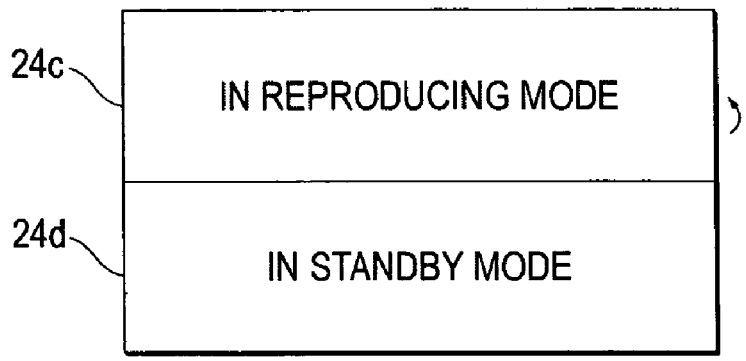
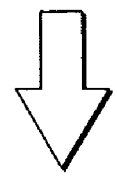
FIG. 6B
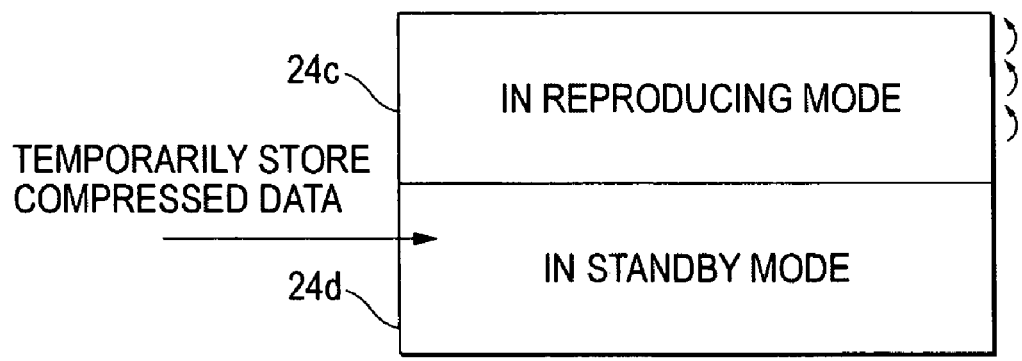
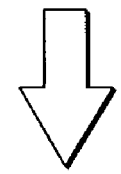
FIG. 6C
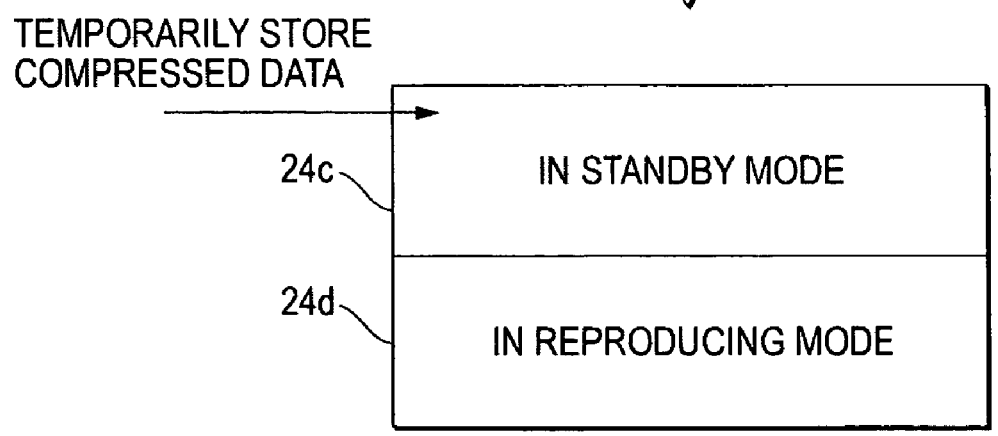

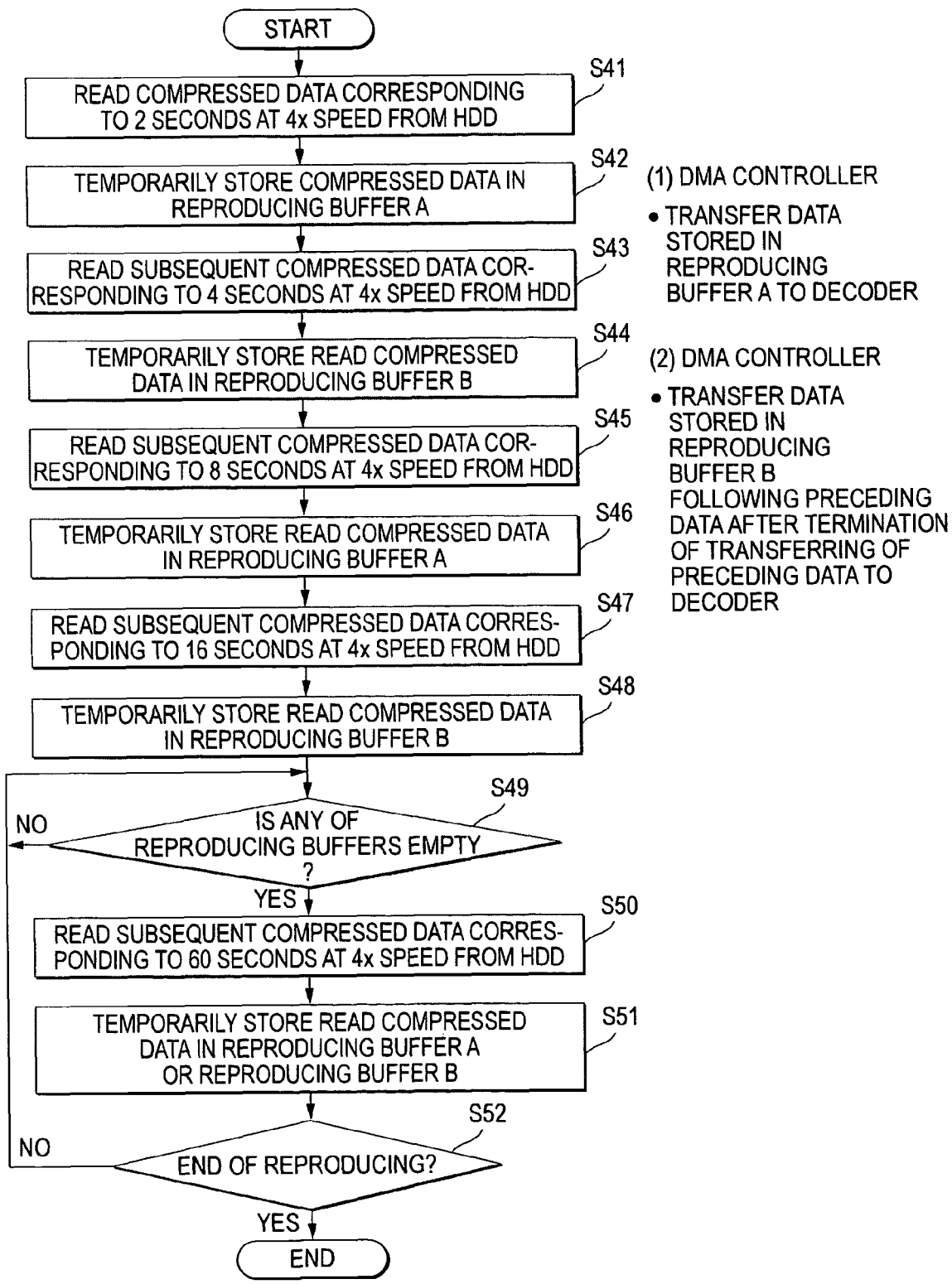

FIG. 16

| | | | | |
|---|---|---|---|---|
| 111. | xxx | | 111. | xxx |
| | | | 222. | xxx |
| | | | 333. | xxx |
| 444. | xxx | | 444. | xxx |
| 555. | xxx | | 555. | xxx |
| 666. | xxx | | 666. | xxx |
| 777. | xxx | | 777. | xxx |
| 888. | xxx | | 888. | xxx |
| 999. | xxx | | 999. | xxx |

F1    F2

RECORDING AND REPRODUCING APPARATUS

BACKGROUND OF THE INVENTION

1. Field of the Invention

This invention relates to a recording and reproducing apparatus and more particularly to a recording and reproducing apparatus for reproducing and dubbing content of audio data, video data, etc.

2. Description of the Related Art

A reproducing apparatus for reproducing a storage medium such as a CD or a DVD is widespread at present. A personal computer (PC), etc., having a dubbing function of allowing audio data read from a CD to be stored on a different storage medium such as a hard disk is commercially available.

In recent years, an art of reproducing one music CD while storing the music data stored on the music CD on a different storage medium has been proposed (for example, refer to JP-A-2002-203361 and JP-A-2003-228907).

JP-A-2002-203361 discloses the following technique as shown in FIG. 17. FIFO (first-in, first-out) 1 used as a dubbing buffer and FIFO 2 used as a reproducing buffer are provided. First, audio data read from a CD is transferred to the FIFO 2. While the audio data stored in the FIFO 2 is read and reproduced at a reproducing data rate (single speed), audio data for dubbing is read from the CD at double speed (higher than the reproduce data rate), the read audio data is transferred to the FIFO 1, and the audio data is stored in a hard disk 6. This process is repeated.

However, in the technique disclosed in JP-A-2002-203361, the audio data stored in the FIFO 1 and FIFO 2 is not subjected to a compression process and is raw audio data read from the CD. Thus, the capacities of the storage areas of the FIFO 1 and FIFO 2 need to be taken large, leading to an increase in cost; this is a problem.

In the technique disclosed in JP-A-2002-203361, when data underrun of the FIFO 2 used as the reproducing buffer is detected, it is necessary to interrupt reading the audio data for dubbing, read the subsequent reproduce audio data from the CD, and store the read audio data in the FIFO 2. If reading the audio data for dubbing is interrupted, of course, the time required for dubbing the audio data onto the hard disk 6 is prolonged and the dubbing efficiency is degraded.

On the other hand, JP-A-2003-228907 discloses the following technique as shown in FIG. 18. An apparatus includes a compression process section 12 for reading audio data at double speed from a reproduce section 11 and performing compression process for the read audio data to provide compressed data, and a recording medium 13 having a data record area 14 for recording compressed data from the compression process section 12 and a temporary record area 15 for recording audio data intact from the reproduce section 11. The audio data recorded in the temporary record area 15 of the recording medium 13 is output to a signal processing section 16 at the reproduce data rate (single speed).

However, in the technique disclosed in JP-A-2003-228907, as in the technique disclosed in JP-A-2002-203361, the audio data recorded in the temporary record area 15 is not subjected to a compression process and is raw audio data read from a CD, etc. Thus, the capacity of the temporary record area 15 needs to be taken large, leading to an increase in cost; this is a problem.

JP-A-2003-228907 also discloses the following technique. When dubbing a CD recording 80-minute music at quadruple speed, for example, the audio data corresponding to the first 20 minutes is recorded in a temporary record area 15, for the first 20 minutes, the audio data recorded in the temporary record area 15 is output to a signal processing section 18 at the reproduce data rate, and for the audio data corresponding to the remaining 60 minutes, audio data recorded in a data record area 20 is read at the reproduce data rate, and the audio data subjected to decompression process in a compression-decompression process section 19 is output to the signal processing section 18, as shown in FIG. 19. Accordingly, the capacity of the temporary record area 15 can be lessened and the storage medium of the CD, etc., in a reproduce section 11 can be released early.

However, in the technique disclosed in JP-A-2003-228907, the audio data output to the signal processing section 18 is switched from uncompressed audio data to compressed audio data. Thus, the audio quality may be degraded suddenly. Therefore, it is difficult to keep constant the sound quality level of audio provided for the user; this is a problem.

SUMMARY OF THE INVENTION

The invention provides a recording and reproducing apparatus for making it possible to dub audio data or video data concurrently while reproducing the audio data or video data with keeping constant the sound quality level of audio and the image quality level of video provided for the user without having an excessive temporary storage area and also for making it possible to enhance the user satisfaction level.

To the end, according to one embodiment of the invention, a recording and reproducing apparatus for reproducing information recorded on a recording medium concurrently while recording the information, includes a compression section, a temporary storage section, a reproducing process section, and a storage section. The compression section reads the information recorded on the recording medium and compresses read information. The temporary storage section stores compressed information provided by the compression process. The reproducing process section decompresses the compressed information output thereto from the temporary storage section and reproduces decompressed information. The storage section stores the compressed information output thereto from the temporary storage section.

This recording and reproducing apparatus does not require an excessive temporary storage area because of adopting compressed information. Thus, even if a temporary storage area is used, an increase in the cost can be suppressed. The information (for example, audio data) is reproduced with using the compressed information obtained by the compression process (namely, the compressed information stored in the storage section). That is, the information is reproduced with keeping abreast of dubbing the information. Therefore, reproducing a piece of music can be started early.

The information and the compressed information can be read at higher speed than the usual reproducing speed (the single speed), but the information needs to be reproduced at single speed. Thus, if an area for temporarily storing the compressed information used for reproducing is not provided, it is necessary to read the compressed information from the storage section at the single speed. In other words, if an area for temporarily storing the compressed information used for reproducing is provided, the compressed information can be read from the storage section at any desired speed rather than at the single speed.

Although there is almost no problem when the recording and reproducing apparatus is used indoors, the possibility that a dropout (skip) may occur due to vibration, etc., is increased if the recording and reproducing apparatus is used in a mobile as in a cabin of a vehicle. Methods for solving this problem include a method of temporarily storing data.

In the recording and reproducing apparatus as set forth above, the compressed information is stored in the temporary storage section. Therefore, a dropout (skip) can also be prevented. Data stored in the temporary storage area is the compressed information rather than the information, so that the storage capacity can be lessened and an increase in the cost can be suppressed.

According to one embodiment of the invention, the temporary storage section may store the compressed information output thereto from the storage section.

Also, this recording and reproducing apparatus can reproduce the information with using the compressed information stored in the storage section. For example, reproducing a piece of music can be accomplished without reading the information (music data) for reproducing from music CD. Therefore, reading the information (music data) for dubbing from the music CD need not be interrupted. Accordingly, the information can be efficiently dubbed in the storage section (a recording medium for dubbing).

Also, with this configuration, the compressed information can be read from the storage section at any desired speed rather than at the single speed.

According to one embodiment of the invention, the temporary storage section may have a first area that stores the compressed information to be output to the reproducing process section and a second area that stores the compressed information to be output to the storage section, independently from each other.

With this configuration, dubbing can be executed without being affected by information reproducing, so that the efficiency of the dubbing can be improved.

According to one embodiment of the invention, the temporary storage section may have a first area that stores the compressed information to be output to the reproducing process section and a second area that stores the compressed information to output to the storage section, the first area and the second area being the same area.

With this configuration, information reproducing is affected by dubbing, but the capacity of the temporary storage area can be suppressed, so that the cost can be reduced.

According to one embodiment of the invention, the temporary storage section may have a first area that stores the compressed information to be output to the reproducing process section and a second area that stores the compressed information to be output to the storage section, the first area and the second area being multiplexed.

With this configuration, a temporary storage area being currently used and another temporary storage area in a standby mode can be provided. Therefore, reproducing and dubbing can be performed efficiently without the loss of time.

According to one embodiment of the invention, a storage capacity of the temporary storage section may be equal to or greater than that of the recording medium With this configuration, for example, music data (information) recorded on one music CD (recording medium) can be written into the storage section at a time. Therefore, load on software can be lightened. The writing efficiency of data into the storage section can be improved.

According to one embodiment of the invention, the temporary storage section may store boundary information indicating boundary between pieces of the information.

With this configuration, for example, if plural pieces of music are recorded in one music CD, each piece of music can be assigned to a separate file.

According to one embodiment of the invention, a storage capacity of the temporary storage section may be equal to or greater than one piece of the information stored in the recording medium.

With this configuration, the compressed information stored in the temporary storage area can be transferred intact as one file to the storage section, so that software processing can be simplified.

According to one embodiment of the invention, the recording and reproducing apparatus may further include a fast-forward command section. The fast-forward command section issues a fast-forward command for fast forwarding the information. The reproducing process section decompresses the compressed information stored in the temporary storage section at a speed faster than a normal speed and reproduces decompressed information at the speed faster than the normal speed, when the fast forward command is issued from the fast forward command section during a period in which the compressed information output from the temporary storage section is being stored in the storage section. The normal speed may be equal to a single speed.

With this configuration, fast forward operation is performed with using the compressed information stored in the temporary storage area. Therefore, fast forward operation of information (music data) can be accomplished regardless of whether or not dubbing is complete.

According to one embodiment of the invention, the recording and reproducing apparatus may further include a rewinding command section. The rewinding command section issues a rewinding command for rewinding the information. The reproducing process section may decompress in a reverse direction the compressed information stored in the temporary storage section and reproduce decompressed information, when the rewinding command is issued from the rewinding command section during a period in which the compressed information output from the temporary storage section is being stored in the storage section.

With this configuration, rewinding operation of information can be performed with using the compressed information stored in the temporary storage area. Therefore, information (music data) can be rewound regardless of whether or not dubbing is complete.

According to one embodiment of the invention, the recording and reproducing apparatus may further include a repeat reproducing command section. The repeat reproducing command section issues a repeat reproducing command for reproducing the information repeatedly. The reproducing process section may decompress the compressed information stored in the temporary storage section with starting from a top of the compressed information, when the repeat reproducing command is issued from the repeat reproducing command section during a period in which the compressed information output from the temporary storage section is being stored in the storage section.

With this configuration, repeat reproducing of information (music data) is executed with using the compressed information stored in the temporary storage area. Therefore, repeat reproducing of the information (music data) can be accomplished regardless of whether or not dubbing is complete.

According to one embodiment of the invention, the recording and reproducing apparatus may further include a selection reproducing command section that issues a selection reproducing command. The reproducing process section reads compressed information indicated by the selection reproducing command from the storage section, stores the read compressed information in the temporary storage section, decompresses the compressed information stored in the temporary storage section, and reproduces the decompressed information when the selection reproducing command is issued from the selection reproducing command section during a period in which the compressed information output from the temporary storage section is being stored in the storage section.

With this configuration, the selectively reproducing such as track number increment processing or track number decrement processing can be performed with using the compressed information being stored into the storage section. Therefore, even before dubbing of all contents stored in the recording medium has not been completed, that is, even in the process of the dubbing, the track number increment processing or the track number decrement processing can be performed for the information that have already been stored in the storage section.

According to one embodiment of the invention, the recording and reproducing apparatus may further include a selection reproducing command section that issues a selection reproducing command. The reproducing process section reads compressed data indicated by the selection reproducing command from the storage section, stores the read compressed information in the temporary storage section, decompresses the compressed information stored in the temporary storage section, and reproduces the decompressed information when the selection reproducing command is issued from the selection reproducing command section during a period in which the compressed information output from the temporary storage section is being stored in the storage section.

With this configuration, information (music data), which is different from the information being dubbed, can be reproduced with using the compressed information stored in the storage section. Therefore, the different information can be reproduced regardless of whether or not dubbing is complete.

According to one embodiment of the invention, the recording and reproducing apparatus may further include a recording command section that issues a recording command for recording information being reproduced into the storage section. When the recording command is issued from the recording command section during a period which information is being reproduced, the compressed information corresponding to the information being reproduced is stored in the storage section.

With this configuration, when a user makes a dubbing request, the compressed information corresponding to the information being reproduced is written into the storage section. That is, only the compressed information corresponding to the information, which a user requests to be dubbed, can be written into the storage section. Also, the user can select dubbing or no dubbing of information during a period in which the information is being reproduced. Thus, the user can make the selection through intuition.

According to one embodiment of the invention, the recording and reproducing apparatus may further include a selecting command section that selects information to be recorded in the storage section from among the information recorded in the recording medium. Information selected through the selecting command section is stored in the storage section.

With this configuration, when a user makes a dubbing request, the compressed information corresponding to the information being reproduced is written into the storage section. That is, only the compressed information corresponding to the information, which a user requests to be dub0bed, can be written into the storage section. Also, the user can select dubbing or no dubbing of information during a period in which the information is being reproduced. Thus, the user can make the selection through intuition.

According to one embodiment of the invention, the recording and reproducing apparatus may further include a recording cancel command section that issues a recording cancel command for canceling recording information. When the recording cancel command is issued from the recording cancel command section during a period in which the compressed information is being stored in the storage section, the compressed information corresponding to information, which is being reproduced, is not stored in the storage section.

With this configuration, when a user inputs a recording cancel command through the recording cancel command section, storing the compressed information corresponding to the information being reproduced is cancelled. That is, only compressed information corresponding to information, for which a user does not input the recording cancel command, is written into the storage section. The user is allowed to select dubbing/no dubbing of information being recorded. Thus, the user can make the selection through intuition.

According to one embodiment of the invention, the recording and reproducing apparatus may further include a recording request command section and a releasing control section. The recording request command section issues a recording request command for recording each piece of information in the storage section. The releasing control section deletes or inhibits compressed information corresponding to information, for which the recording request command has not been issued, from the storage section or from being read from the storage section.

With this configuration, unlike a manner in which only compressed information corresponding to information, for which for which a user does not input the recording cancel command, is written into the storage section, compressed information may be once written into the storage section. Then, compressed information corresponding to information, for which a user has not inputted the recording request command, is deleted or is inhibited from being read. Accordingly, the capacity of the temporary storage area can be lessened and the cost can be reduced.

According to one embodiment of the invention, an amount of the compressed information transferred from the storage section to the temporary storage section in a beginning of storing the compressed information in the temporary storage section may be smaller than that at a subsequent time.

In a case of reading compressed information from the storage section, storing the read compressed information in the temporary storage section, decompressing the compressed information stored in the temporary storage section, and reproducing the decompressed information, the larger an amount of the compressed information read from the storage section, the longer time is required before reproducing starts. For example, if music data corresponding to 1 minute is read at 12× speed, the time required for reading the music data is 5 seconds. That is, a 5-second time lag occurs between a timing when a user inputs a command for reproducing a piece of music and a timing when reproducing the piece of music starts.

With the configuration set forth above, the amount of the compressed information read from the storage section and stored in the temporary storage section is small in the beginning of the storing (for example, just after the user inputs a command for reproducing a piece of music) as compared with that at the subsequent time. Accordingly, reproducing the piece of music can be started with almost no time lag after the user inputs a command for reproducing a piece of music. For example, if music data corresponding to 6 seconds is read at 12× speed, the time lag can be reduced to 0.5 seconds.

If the amount of the compressed information stored in the temporary storage area is small, it becomes difficult to perform fast forwarding, etc. However, much compressed information (for example, compressed information corresponding to 1 minute) is stored in the temporary storage area with the passage of time from the storage start. Thus, fast forwarding, etc., can also be covered sufficiently.

According to one embodiment of the invention, the amount of the compressed information transferred from the storage section to the temporary storage section may increase gradually.

With this configuration, the amount of the compressed information stored in the temporary storage area is increased gradually. Therefore, the reproducing response can be improved and the fast forwarding or the like performed at a later time can also be covered appropriately.

According to the invention, there is provided a recording and reproducing apparatus (18) for dubbing the content of audio data, etc., concurrently while reproducing the content of audio data, etc., the recording and reproducing apparatus including compression means for performing compression process for the content read from a storage medium to be dubbed, first reproduce control means for causing decompression means to decompress the compressed information provided by performing the compression process and reproducing the decompressed information, fifth storage means for storing the compressed information of all content stored in the storage medium in a temporary storage area, first content selection means for selecting the content whose dubbing is requested by the user based on information provided through input means that can be operated by the user, and third write means for transferring the compressed information corresponding to the content whose dubbing is requested by the user from the temporary storage area based on the selection result of the first content selection means, thereby writing the compressed information into storage section.

According to the recording and reproducing apparatus (18), only the compressed information corresponding to the content whose dubbing is requested by the user can be written into the storage section. Although the capacity of the temporary storage area is increased, the processing is simplified, so that the processing speed can be enhanced.

According to one embodiment of the invention, a recording and reproducing apparatus has a reproducing function of reproducing information recorded on a recording medium and a recording function of recording the information into a storage section. The recording and reproducing apparatus includes a compression section, a recording control section, and a reproducing process section. The compression section compresses the information recorded in the storage section. The recording control section stores the compressed information provided by the compression section in the storage section. The reproducing process section decompresses the compressed information stored in the storage section and reproduces decompressed information.

With this configuration, information (for example, music data) read from a recording medium (for example, music CD) is written into the storage section (for example, hard disk drive) before a compression process is performed. Then, the compression process is performed. Accordingly, high-speed dubbing is made possible regardless of the performance of the compression section (encoder). This is particularly useful if a user wants to release a storage medium such as music CD as early as possible.

According to one embodiment of the invention, the reproducing process section may reproduce uncompressed information recorded in the storage section while the compression section is compressing the information.

With this configuration, information (music data) can be reproduced with using the uncompressed information recorded in the storage section. That is, information can be reproduced without waiting for completion of the compression process.

According to one embodiment of the invention, the recording and reproducing apparatus may further include an uncompressed information storage section that temporarily stores the uncompressed information to be recorded in the storage section.

Although there is almost no problem when the recording and reproducing apparatus is used indoors, the possibility that a dropout (skip) may occur due to vibration, etc., is increased if the recording and reproducing apparatus is used in a mobile as in the cabin of a vehicle. Methods for solving this problem include a method of temporarily storing data.

With the configuration set forth above, the compressed information used for dubbing is stored in the uncompressed information storage section. Therefore, a dropout (skip), etc., can be prevented.

According to one embodiment of the invention, the recording and reproducing apparatus may further include a compressed information temporary storage section that temporarily stores the compressed information.

Information and compressed information can be read at higher speed than the usual reproduce speed (single speed). However, information needs to be reproduced at single speed. Thus, if an area for temporarily storing the compressed information used for reproducing is not provided, it is necessary to read the compressed information from the storage section at single speed. In other words, if an area for temporarily storing the compressed information used for reproducing is provided, the compressed information can be read from the storage section at any desired speed rather than at single speed.

With the configuration set forth above, the compressed information used for reproducing is stored in the compressed information storage section. Therefore, the compressed information can be read from the storage section at any desired speed rather than at single speed.

BRIEF DESCRIPTION OF THE DRAWINGS

In the accompanying drawings:

FIG. 6 is a schematic representation to describe a use example of the buffer memory in the recording and reproducing apparatus according to the first embodiment of the invention;

FIG. 9 is a flowchart to show process operation performed by the system controller in the recording and reproducing apparatus according to the first embodiment of the invention;

FIG. 16 is a schematic representation to describe a use example of a management file;

DETAILED DESCRIPTION OF THE PREFERRED EMBODIMENT

Figure 1:
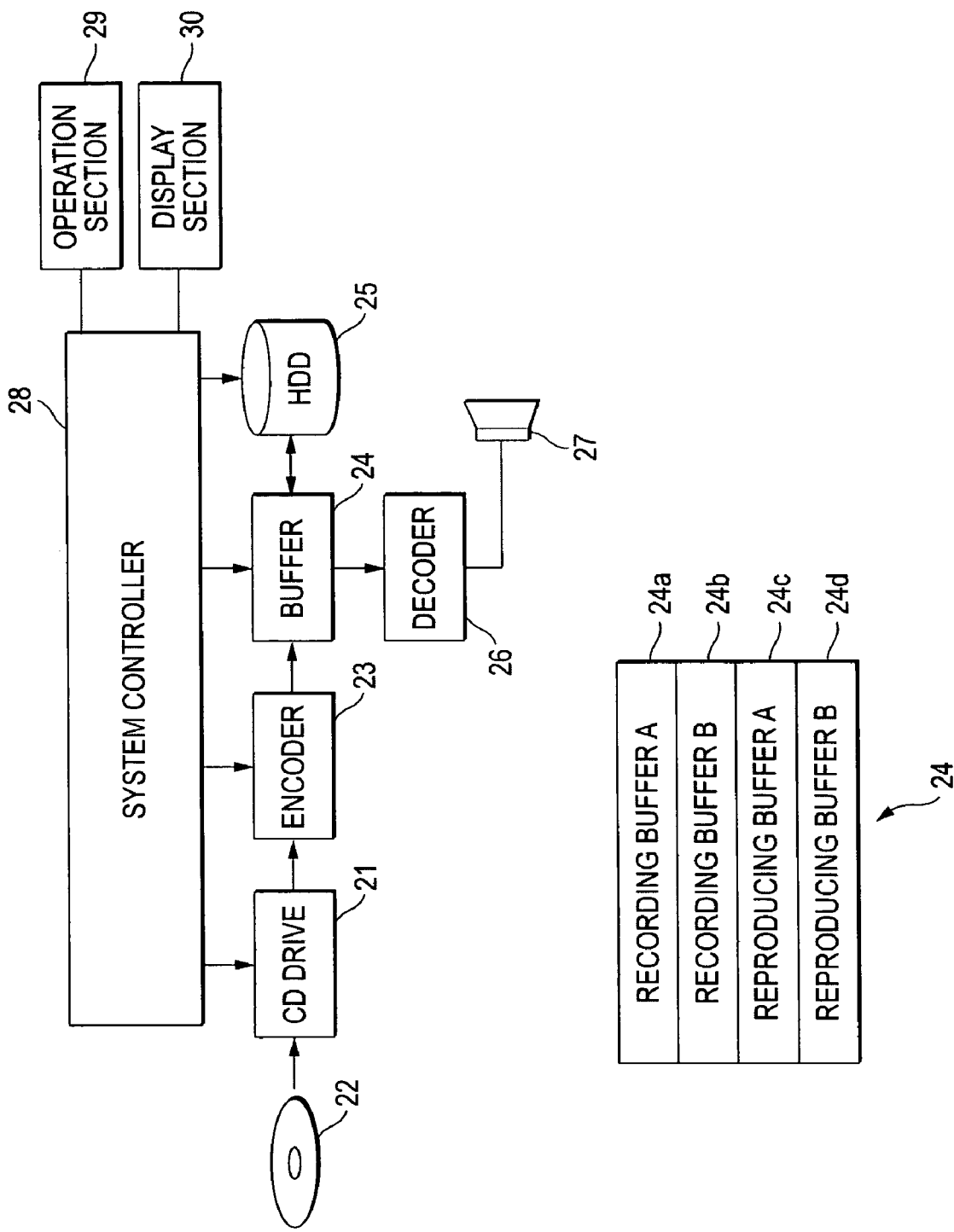
FIG. 1A is a block diagram to schematically show the main part of a recording and reproducing apparatus according to a first embodiment of the invention.
FIG. 1B is a drawing to show configuration of buffer memory.

Referring now to the accompanying drawings, a recording and reproducing apparatus according to embodiments of the invention will be described. FIG. 1A is a block diagram schematically showing the main part of a recording and reproducing apparatus according to a first embodiment of the invention. In the figure, numeral 21 denotes a CD drive that can read content (for example, music data) at double speed or more from a storage medium such as a CD 22.

An encoder 23 for performing a compression process is connected to the CD drive 21. The encoder 23 compresses content read by the CD drive 21. The encoder 23 is connected to an HDD 25 and a decoder 26 through buffer memory 24.

The HDD 25 stores compressed data obtained by the compression process performed by the encoder 23. The decoder 26 performs a decompression process for the compressed data output from the encoder 23 and the compressed data read from the HDD 25. Data obtained by the decompression process performed by the decoder 26 is output from an output section 27 (for example, speaker) through a conversion section (not shown), etc.

The buffer memory 24 temporarily stores the compressed data obtained by the compression process performed by the encoder 23 and transfers the compressed data to the HDD 25 and the decoder 26. The buffer memory 24 also temporarily stores the compressed data read from the HDD 25 and transfers the compressed data to the decoder 26. The data transfer is controlled by a DMA controller (not shown) included in the buffer memory 24 in order to lighten the processing load of a system controller 28 described later.

The buffer memory 24 is divided into a recording buffer A 24a and a recording buffer B 24b, both of which are used for recording, and a reproducing buffer A 24c and a reproducing buffer B 24d, both of which are used for reproducing, as shown in FIG. 1B. The compressed data to be transferred to the HDD 25 is stored in the recording buffer A 24a or the recording buffer B 24b, and the compressed data to be transferred to the decoder 26 is stored in the reproducing buffer A 24c or the reproducing buffer B 24d.

The system controller 28 including a CPU, etc., is connected to the CD drive 21, the encoder 23, the buffer memory 24, and the HDD 25; for example, it can control the CD drive 21, thereby extracting (ripping) music data from the CD 22 set in the CD drive 21. An operation section 29 that can be operated by the user and a display section 30 are connected to the system controller 28.

Figure 2:
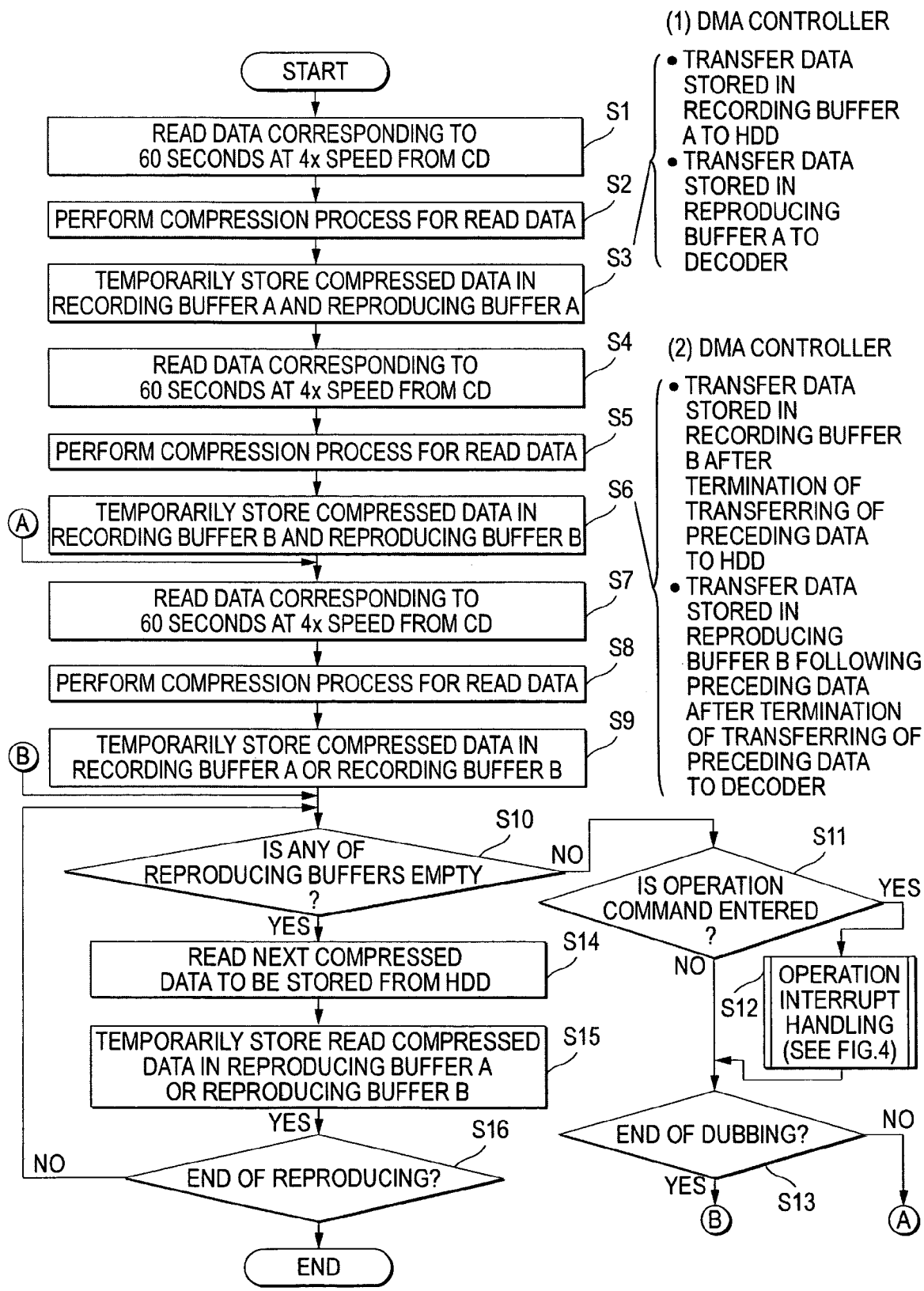
FIG. 2 is a flowchart to show process operation performed by a system controller in the recording and reproducing apparatus according to the first embodiment of the invention.
Figure 3:
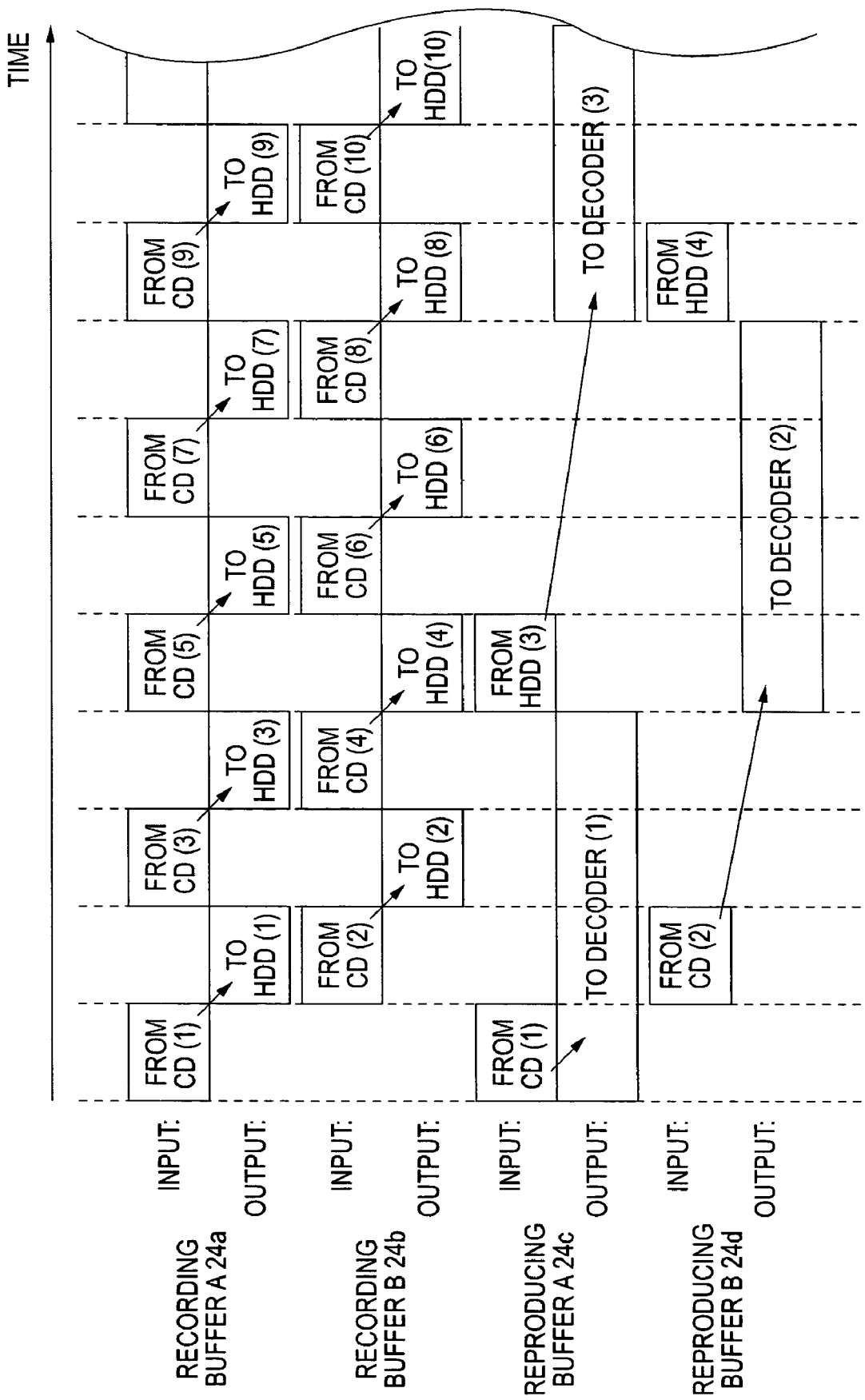
FIG. 3 is a recording/reproducing timing chart in the recording and reproducing apparatus according to the first embodiment of the invention.

Process operation [1-1] performed by the system controller 28 in the recording and reproducing apparatus according to the first embodiment will be discussed with reference to a flowchart of FIG. 2 and a recording/reproducing timing chart of FIG. 3. Process operation [1-1] is performed when the user operates the operation section 29 to select a parallel mode for dubbing while reproducing a musical piece.

To begin with, the CD drive 21 is controlled so that music data corresponding to 60 seconds is read at high speed (for example, at quadruple speed) from the CD 22 (step S1) and the read music data is compressed in the encoder 23 (step S2). The compressed data obtained by the compression process performed by the encoder 23 is temporarily stored in the recording buffer A 24a and the reproducing buffer A 24c (step S3).

When compressed data is input in a state in which the recording buffer A 24a and the recording buffer B 24b are empty, the DMA controller included in the buffer memory 24 transfers the input compressed data (compressed data stored in the recording buffer A 24a) to the HDD 25 at high speed (at least at quadruple speed or more). On the other hand, when compressed data is input in a state in which the reproducing buffer A 24c and the reproducing buffer B 24d are empty, the DMA controller transfers the input compressed data (compressed data stored in the reproducing buffer A 24c) to the decoder 26 at single speed. The compressed data transferred to the decoder 26 is decompressed in the decoder 26 and output from the output section 27, as described above. That is, the data is output as audio.

Next, the subsequent music data corresponding to 60 seconds is read at high speed (for example, at quadruple speed) from the CD 22 (step S4) and the read music data is compressed in the encoder 23 (step S5). The compressed data obtained by the compression process performed by the encoder 23 is temporarily stored in the recording buffer B 24b and the reproducing buffer B 24d (step S6).

When compressed data is input into the buffer 24 in a state in which the recording buffer A 24a is not empty (that is, the recording buffer A 24a has the data to be transferred to the HDD 25), the DMA controller transfers newly input compressed data (compressed data stored in the recording buffer B 24b) to the HDD 25 at high speed (at least at quadruple speed or more) after termination of the transfer of the preceding compressed data (compressed data stored in the recording buffer A 24a) to the HDD 25. On the other hand, when compressed data is input into the buffer 24 in a state in which the reproducing buffer A 24c is not empty (that is, the reproducing buffer A 24c has the data to be transferred to the decoder 26), the DMA controller transfers the input compressed data (compressed data stored in the reproducing buffer B 24d) to the decoder 26 at single speed following the preceding compressed data (so as not to interrupt music) after termination of the transfer of the preceding compressed data (compressed data stored in the reproducing buffer A 24c) to the decoder 26.

Next, the subsequent music data corresponding to 60 seconds is read at high speed (for example, at quadruple speed) from the CD 22 (step S7) and the read music data is compressed in the encoder 23 (step S8). The compressed data obtained by the compression process performed by the encoder 23 is temporarily stored in the empty buffer of the recording buffer A 24a or the recording buffer B 24b (step S9). The reason why the compressed data is not temporarily stored in the reproducing buffer is that it takes longer time to discharge data from the reproducing buffer as compared with the recording buffer as seen in the timing chart of FIG. 3.

For example, when compressed data is input into the buffer 24 in a state in which the recording buffer B 24b is not empty (that is, the recording buffer B24b has the data to be transferred to the HDD 25), the DMA controller transfers newly input compressed data (compressed data stored in the recording buffer B 24a) to the HDD 25 at high speed (at least at quadruple speed or more) after termination of the transfer of the preceding compressed data (compressed data stored in the recording buffer B 24b) to the HDD 25, as described above.

Here, music data corresponding to a predetermined time period (for example, 60 seconds) is read. However, since a piece of music may not complete with a multiple of a predetermined time period such as one minute, two minutes, three minutes, etc., it is desirable that read of music data should be adjusted in accordance with length of each piece of music. For example, if one musical piece takes 3 minutes 44 seconds, music data corresponding to 60 seconds is read from the first time to the third time and music data corresponding to only 44 seconds is read at the fourth time.

Here, compressed data corresponding to predetermined-time (for example, 60-second) music data is stored in the recording buffer A 24a, the recording buffer B 24b, the reproducing buffer A 24c, the reproducing buffer B 24d. However, in another embodiment, the capacity of each buffer may be set larger than the data capacity of one musical piece so that the data of one musical piece rather than predetermined-time music data is read and is stored in the buffers. Accordingly, the processing load can be lightened.

Next, whether or not any of the reproducing buffer A 24c and the reproducing buffer B 24d is empty is determined (step S10). If it is concluded that neither of the buffers 24c, 24d is empty, then whether or not a user enters a command of fast forward, etc., is determined based on information obtained from the operation section 29 (step S11).

If it is concluded that the user enters a command of fast forward, etc., operation interrupt handling is performed (step S12) and then, whether or not dubbing of the music data stored on the CD 22 terminates is determined (step S13). On the other hand, if it is not concluded that the user enters a command of fast forward, etc., operation interrupt handling need not be performed. Thus, the process goes to step S13 and whether or not the dubbing terminates is determined. If it is not concluded that the dubbing terminates, music data needs to be read from the CD 22, and thus the process returns to step S7; on the other hand, if it is concluded that the dubbing terminates, music data need not be read from the CD 22 and thus the process returns to step S10.

On the other hand, if it is determined at step S10 that one of the reproducing buffer A 24c and the reproducing buffer B 24d is empty, the next compressed data to be stored in the empty reproducing buffer is read from the HDD 25 (step S14), and the read compressed data is temporarily stored in the one of the reproducing buffer A 24c and the reproducing buffer B 24d, which is empty (step S15).

Next, whether or not reproducing terminates is determined (step S16). If it is concluded that reproducing terminates, process operation [1-1] is terminated; if it is not concluded that reproducing terminates, the process returns to step S10.

For example, when compressed data is input into the buffer 24 in a state in which the reproducing buffer B 24d is not empty (that is, the reproducing buffer B 24d has the data to be transferred to the decoder 26), the DMA controller transfers newly input compressed data (compressed data stored in the reproducing buffer A 24c) to the decoder 26 at single speed following the preceding compressed data after termination of the transfer of the preceding compressed data (compressed data stored in the reproducing buffer B 24d) to the decoder 26.

Figure 4:
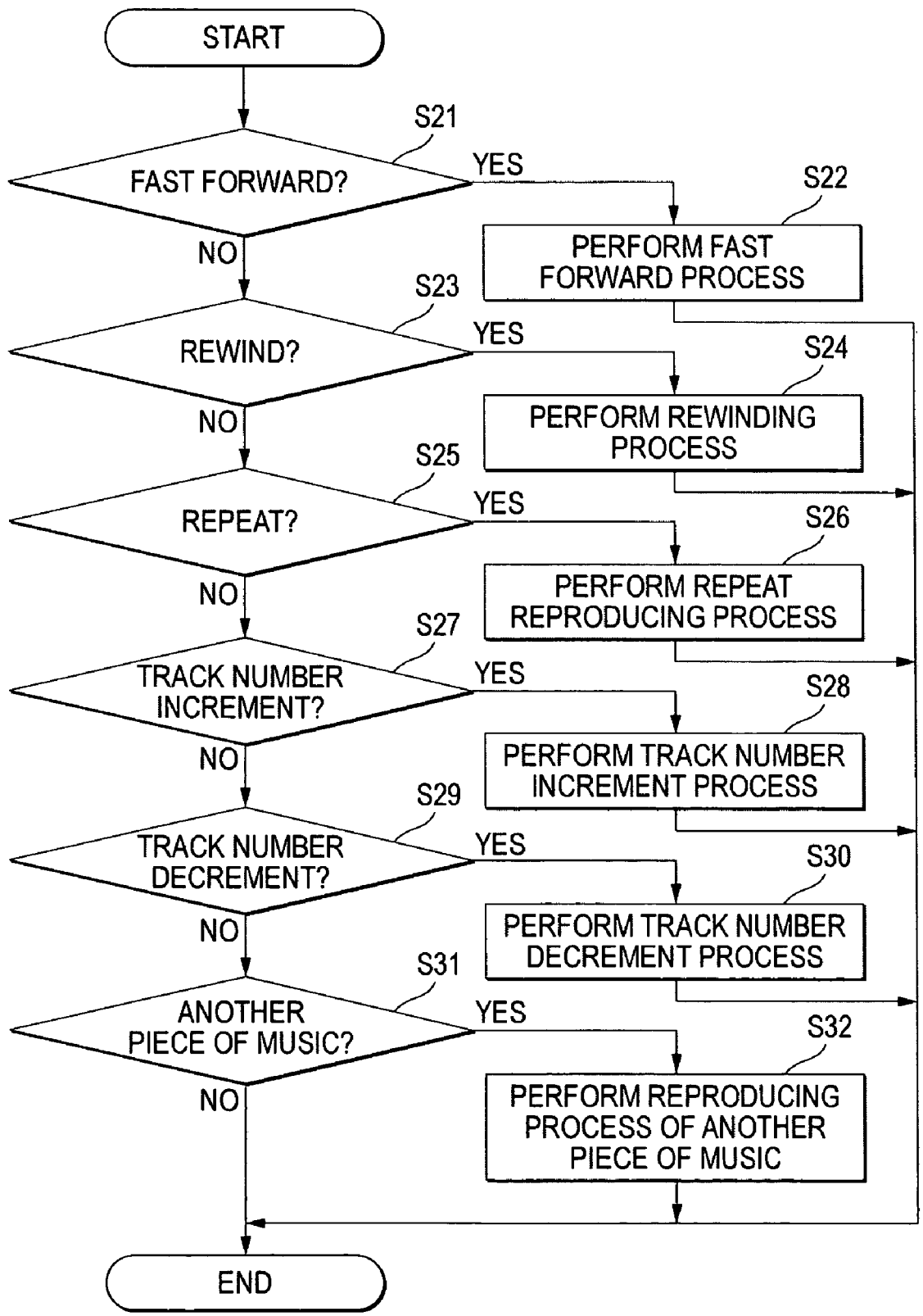
FIG. 4 is a flowchart to show process operation performed by the system controller in the recording and reproducing apparatus according to the first embodiment of the invention.

Next, process operation [1-2] (step S12 in FIG. 2) performed by the system controller 28 in the recording and reproducing apparatus according to the first embodiment will be discussed with reference to a flowchart of FIG. 4. First, whether or not the user enters a command of fast forward is determined based on the information obtained from the operation section 29 (step S21). If it is concluded that the user enters a command of fast forward, a fast forward process is performed (step S22) as shown in FIG. 5.

Fast Forward Process

Figure 5A:
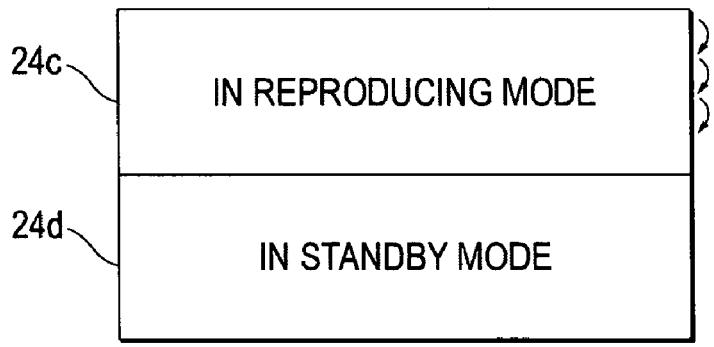
FIG. 5 is a schematic representation to describe a use example of the buffer memory in the recording and reproducing apparatus according to the first embodiment of the invention.
Figure 5B:
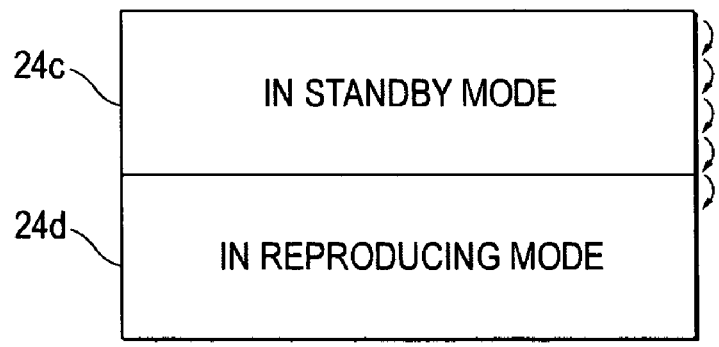
Figure 5C:
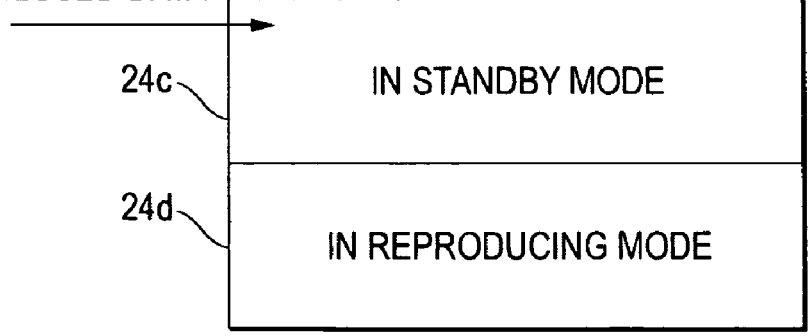

First, compressed data is read at high speed from the reproducing buffer A 24c (the current reproducing buffer used for reproducing), and the read compressed data is decompressed in the decoder 26 as shown in FIG. 5A. Upon completion of reading the compressed data stored in the reproducing buffer A 24c (the current reproducing buffer used for reproducing), compressed data is read successively from the reproducing buffer B 24d (the other reproducing buffer) in a standby mode. At this time the reproducing buffer B 24d enters a reproducing mode, and the reproducing buffer A 24c enters the standby mode as shown in FIG. 5B. The subsequent compressed data is read from the HDD 25, and the read compressed data is stored in the reproducing buffer A 24c, which newly enters the standby mode.

If it is not concluded at step S21 that the user enters a command of fast forward, then whether or not the user enters a command of rewinding is determined based on the information obtained from the operation section 29 (step S23). If it is concluded that the user enters a command of rewinding, Rewinding process is performed (step S24) as shown in FIG. 6.

Rewinding Process

First, compressed data is read in the backward direction from the reproducing buffer A 24c (the current reproducing buffer used for reproducing), and the read compressed data is decompressed in the decoder 26 as shown in FIG. 6A. The preceding compressed data is read from the HDD 25, and the read compressed data is stored in the reproducing buffer B 24d (the other reproducing buffer) in the standby mode as shown in FIG. 6B. Upon completion of reading the compressed data stored in the reproducing buffer A 24c (the current reproducing buffer used for reproducing), compressed data is read successively from the reproducing buffer B 24*d* (the other reproducing buffer) in the standby mode. At this time, the reproducing buffer B 24*d* enters the reproducing mode, and the reproducing buffer A 24*c* enters the standby mode as shown in FIG. 6C. The further preceding compressed data is read from the HDD 25, and the read compressed data is stored in the reproducing buffer A 24*c*, which newly enters the standby mode.

If it is not concluded at step S23 that the user enters a command of rewinding, then whether or not the user enters a command of repeat reproducing is determined based on the information obtained from the operation section 29 (step S25). If it is concluded that the user enters a command of repeat reproducing, repeat reproducing process is performed (step S26).

Repeat Reproducing Process

First, if the head portion of a piece of music being reproduced is stored in the current reproducing buffer used for reproducing, the compressed data stored in the current reproducing buffer is read from the top and the read compressed data is decompressed in the decoder 26. On the other hand, if the head portion of the piece of music being reproduced is not stored in the current reproducing buffer, the music data containing the head portion of the piece of music is read from the HDD 25 and the read compressed data is stored in the other reproducing buffer in the standby mode and is decompressed in the decoder 26. Further, the music data containing the subsequent portion of the piece of music is read from the HDD 25 and the read compressed data is stored in the reproducing buffer newly entering the standby mode.

If it is not concluded at step S25 that the user enters a command of repeat reproducing, then whether or not the user enters a command of track number increment is determined based on the information obtained from the operation section 29 (step S27). If it is concluded that the user enters a command of track number increment, a track number increment process is performed (step S28), as shown in FIG. 7.

Track Number Increment Process

Figure 7A:
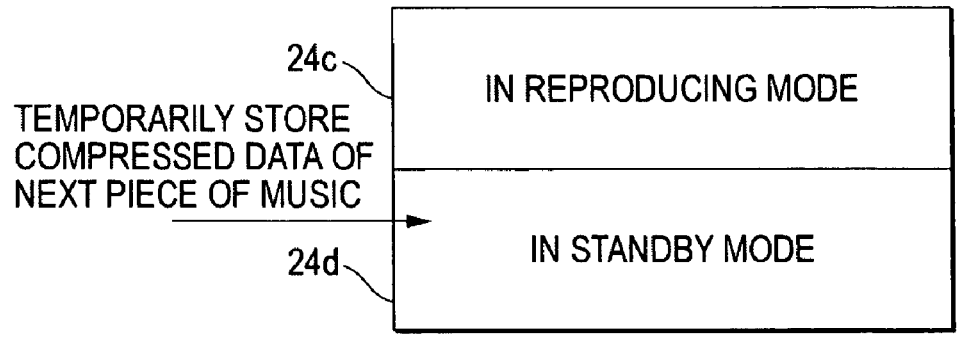
FIG. 7 is a schematic representation to describe a use example of the buffer memory in the recording and reproducing apparatus according to the first embodiment of the invention.
Figure 7B:
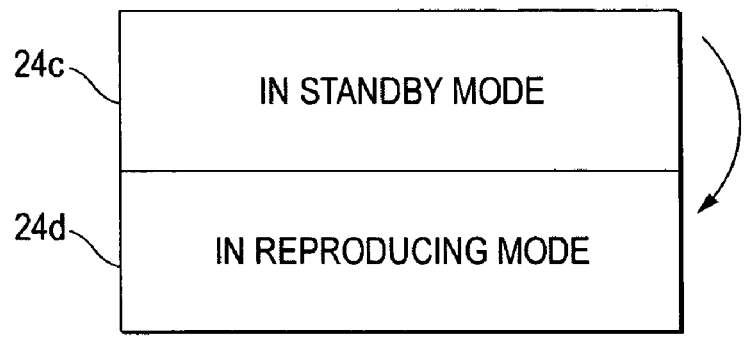
Figure 7C:
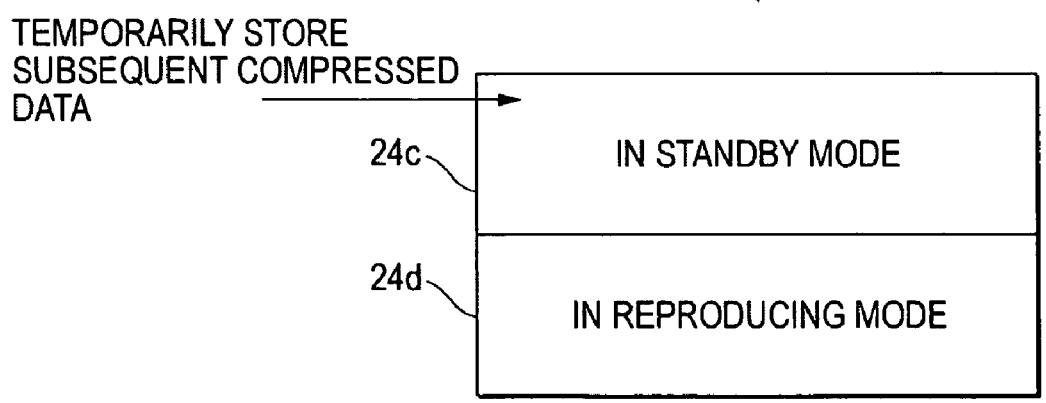

First, the music data containing the head portion of the next piece of music to be reproduced is read from the HDD 25 and the read compressed data is stored in the reproducing buffer B 24*d* (the reproducing buffer in the standby mode) as shown in FIG. 7A, and the compressed date stored in the reproducing buffer B 24*d* is decompressed in the decoder 26 as shown in FIG. 7B. When the reproducing buffer B 24*d* enters the reproducing mode, the reproducing buffer A 24*c* enters the standby mode. Further, the music data containing the subsequent portion of the next piece of music is read from the HDD 25, and the read compressed data is stored in the reproducing buffer A 24*c*, which newly enters the standby mode as shown in FIG. 7C. If the track number increment is not one and is two or more, the compressed data of the piece of music corresponding to the track number increment count is read from the HDD 25.

If it is not concluded at step S27 that the user enters a command of track number increment, then whether or not the user enters a command of track number decrement is determined based on the information obtained from the operation section 29 (step S29). If it is concluded that the user enters a command of track number decrement, a track number decrement process is performed (step S30), as shown in FIG. 8.

Track Number Decrement Process

Figure 8A:
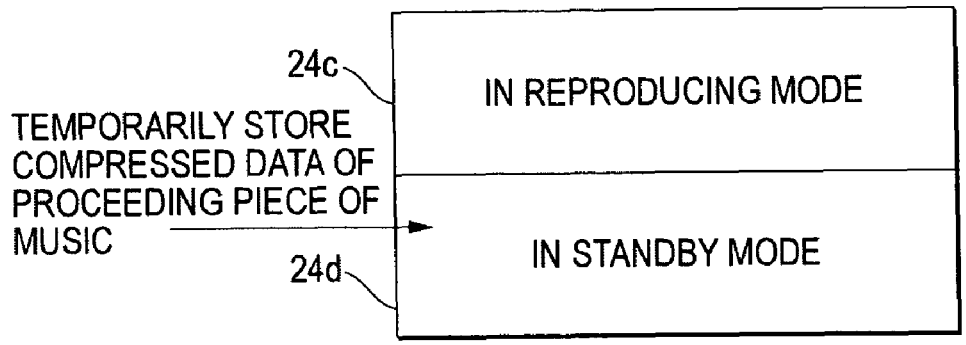
FIG. 8 is a schematic representation to describe a use example of the buffer memory in the recording and reproducing apparatus according to the first embodiment of the invention.
Figure 8B:
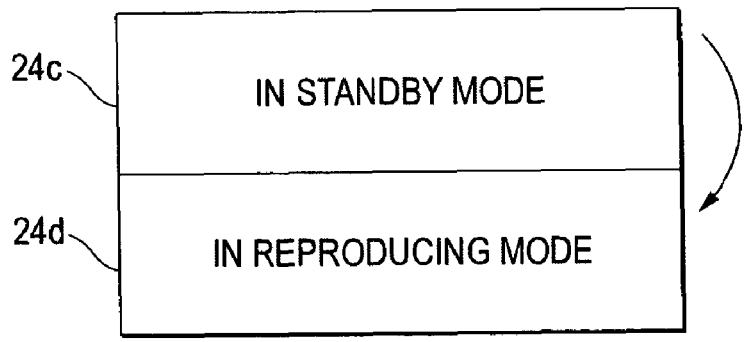
Figure 8C:
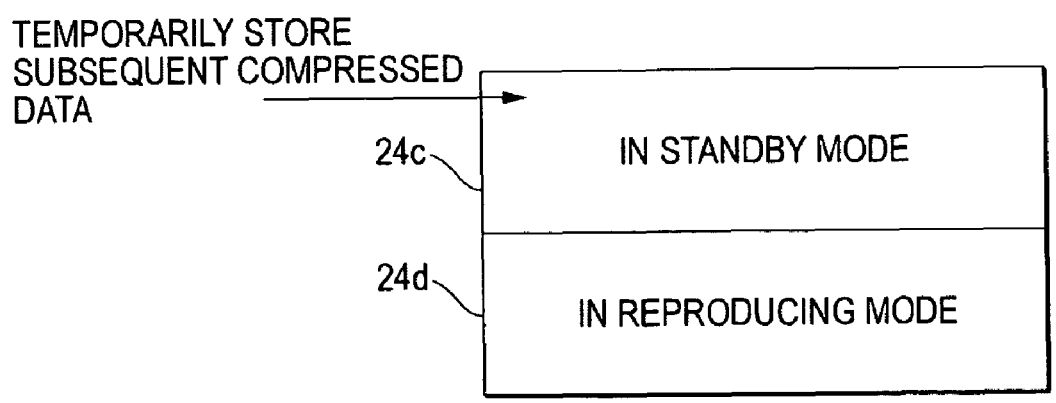

First, the music data containing the head portion of the immediately preceding reproduced piece of music is read from the HDD 25, and the read compressed data is stored in the reproducing buffer B 24*d* in the standby mode as shown in FIG. 8A, and the compressed data stored in the reproducing buffer B 24*d* is decompressed in the decoder 26 as shown in FIG. 8B. When the reproducing buffer B 24*d* enters the reproducing mode, the reproducing buffer A 24*c* enters the standby mode. Further, the music data containing the subsequent portion of the piece of music is read from the HDD 25 and the read compressed data is stored in the reproducing buffer A 24*c*, which newly enters the standby mode as shown in FIG. 8C. If the track number decrement is not one and is two or more, the compressed data of the piece of music corresponding to the track number decrement count is read from the HDD 25.

If it is not concluded at step S29 that the user enters a command of track number decrement, then whether or not the user enters a reproducing command of a piece of music recorded on a different CD from the CD 22 being reproduced is determined based on the information obtained from the operation section 29 (step S31). If it is concluded that the user enters a reproducing command of a piece of music recorded on a different CD, different piece of music reproducing process is performed (step S32).

Different Piece of Music Reproducing Process

First, the music data containing the head portion of the piece of music recorded on the different CD is read from the HDD 25, and the read compressed data is stored in the reproducing buffer in the standby mode and is decompressed in the decoder 26. Further, the music data containing the subsequent portion of the piece of music is read from the HDD 25 and the read compressed data is stored in the reproducing buffer newly entering the standby mode.

Next, process operation [1-3] performed by the system controller 28 in the recording and reproducing apparatus according to the first embodiment will be discussed with reference to a flowchart of FIG. 9. Process operation [1-3] is performed when the user operates the operation section 29 to enter a command of reproducing a piece of music stored in the HDD 25.

Figure 10A:
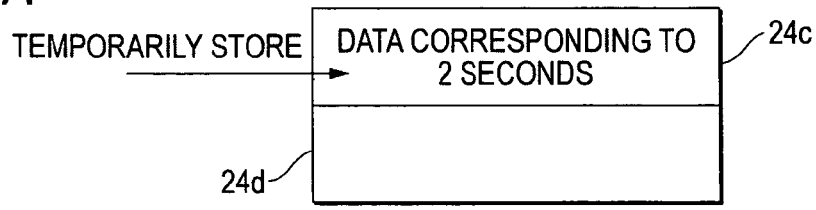
FIG. 10 is a schematic representation to describe a use example of the buffer memory in the recording and reproducing apparatus according to the first embodiment of the invention.

To begin with, compressed data, corresponding to first 2 seconds, of a piece of music indicated by the user is read at quadruple speed from the HDD 25 (step S41). That is, the compressed data containing the head portion of the piece of music is read in 0.5 seconds. Next, the read compressed data is temporarily stored in the reproducing buffer A 24*c* (step S42), as shown in FIG. 10A.

When compressed data is input into the buffer 24 in a state in which the reproducing buffer A 24*c* and the reproducing buffer B 24*d* are empty, the DMA controller included in the buffer memory 24 transfers the input compressed data (compressed data stored in the reproducing buffer A 24*c*) to the decoder 26 at single speed, as described above. The compressed data transferred to the decoder 26 is decompressed in the decoder 26 for output from the output section 27. That is, the data is output as audio.

Figure 10B:
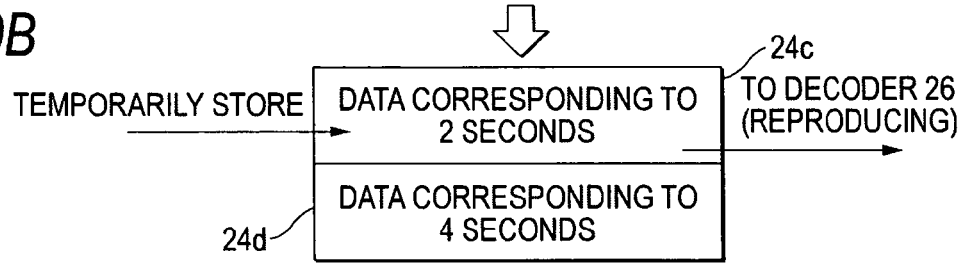

Next, the subsequent compressed data, corresponding to 4 seconds, of the piece of music is read at quadruple speed from the HDD 25 (step S43) and the read compressed data is temporarily stored in the reproducing buffer B 24*d* (step S44), as shown in FIG. 10B. Therefore, the subsequent compressed data corresponding to 4 seconds is stored in the buffer memory 24 (reproducing buffer B 24*d*) before the termination of reproducing the compressed data corresponding to the first 2 seconds.

When compressed data is input into the buffer 24 in a state in which the reproducing buffer A 24*c* is not empty (that is, the reproducing buffer A 24*c* has data to be transferred to the decoder 26), the DMA controller transfers the input compressed data (compressed data stored in the reproducing buffer B 24d) to the decoder 26 at single speed following the preceding compressed data (so as not to interrupt the piece of music) after termination of the transfer of the preceding compressed data (compressed data stored in the reproducing buffer A 24c) to the decoder 26, as described above.

Figure 10C:
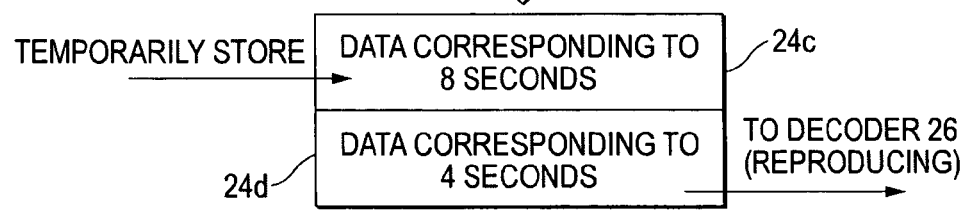

Next, the subsequent compressed data, corresponding to 8 seconds, of the piece of music is read at quadruple speed from the HDD 25 (step S45) and the read compressed data is temporarily stored in the reproducing buffer A 24c (step S46), as shown in FIG. 10C. Therefore, the subsequent compressed data corresponding to 8 seconds is stored in the buffer memory 24 (reproducing buffer A 24c) before the termination of reproducing the compressed data corresponding to the first 6 (=2+4) seconds.

Figure 10D:
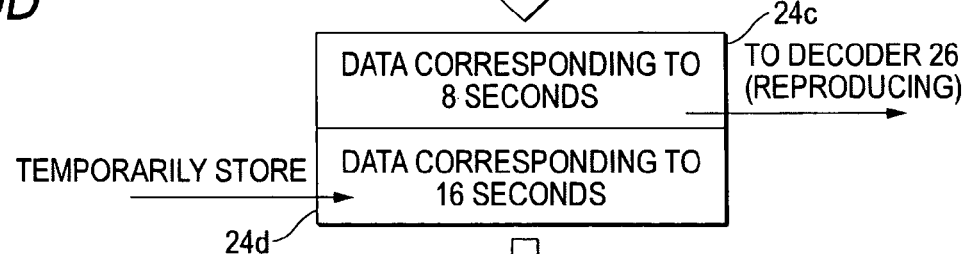

Next, the subsequent compressed data, corresponding to 16 seconds, of the piece of music is read at quadruple speed from the HDD 25 (step S47) and the read compressed data is temporarily stored in the reproducing buffer B 24d (step S48), as shown in FIG. 10D. Therefore, the subsequent compressed data corresponding to 16 seconds is stored in the buffer memory 24 (reproducing buffer B 24d) before the termination of reproducing the compressed data corresponding to the first 14 (=2+4+8) seconds.

Figure 10E:
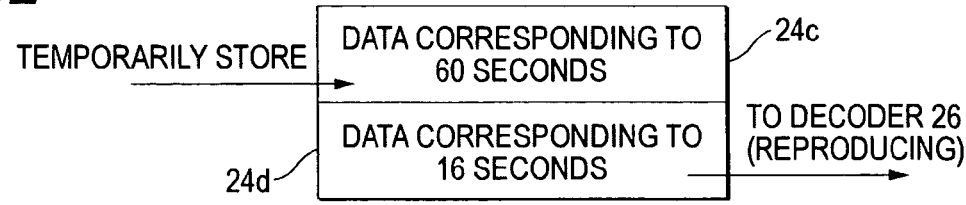
Figure 10F:
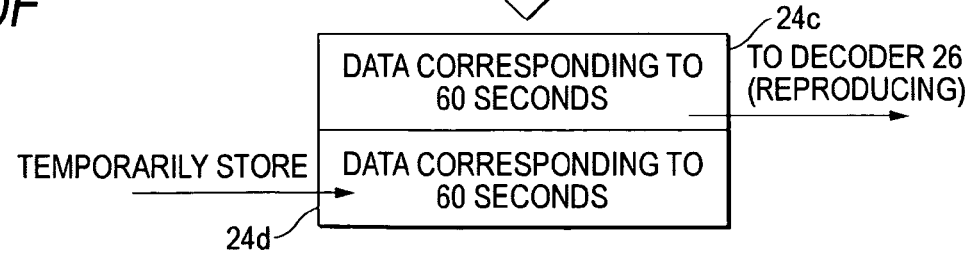

Next, whether or not any of the reproducing buffer A 24c and the reproducing buffer B 24d is empty is determined (step S49). If it is concluded that neither of the reproducing buffers 24c, 24d is empty, the process returns to step S49; if it is concluded that one of the reproducing buffers 24c, 24d is empty, the subsequent compressed data, corresponding to 60 seconds, of the piece of music is read at quadruple speed from the HDD 25 (step S50) and the read compressed data is temporarily stored in the one of the reproducing buffer A 24c and the reproducing buffer B 24d (step S51), which is empty, as shown in FIGS. 10E, 10F.

Next, whether or not reproducing terminates is determined (step S52). If it is concluded that reproducing terminates, process operation [1-3] is terminated; if it is not concluded that reproducing terminates, the process returns to step S49.

The recording and reproducing apparatus according to the first embodiment does not require excessive buffer memory 24 because of adopting compressed data. Thus, an increase in the cost can be suppressed. In the beginning of the parallel mode (for 120 seconds from the starting in FIG. 3), a piece of music is reproduced using the compressed data obtained by the compression process performed by the encoder 23. That is, the piece of music is reproduced keeping abreast of recording. Therefore, reproducing the piece of music can be started early.

After the beginning of the parallel mode (after 120 seconds has elapsed in FIG. 3), the piece of music is reproduced using the compressed data stored in the HDD 25. That is, reproducing the piece of music can be accomplished without reading the music data from the CD 22. Therefore, reading the music data for dubbing from the CD 22 need not be interrupted. Accordingly, the piece of music can be recorded in the HDD 25 efficiently.

The recording and reproducing apparatus according to the first embodiment allows the user to enter commands of fast forward, rewinding, repeat reproducing, track number increment, track number decrement, etc., of pieces of music even if dubbing has not been completed. When reproducing a piece of music stored in the HDD 25, the amount of the compressed data to be stored in the reproducing buffer (reproducing buffer A 24c, reproducing buffer B 24d) may be small in the beginning and then be gradually increased, so that response to the user command can be speeded up. The method of gradually increasing the amount of the data to be stored in the buffer memory 24 may be adopted in the parallel mode rather than in the reproducing mode where the user enters a command of reproducing a piece of music.

Figures 11A, 11B:
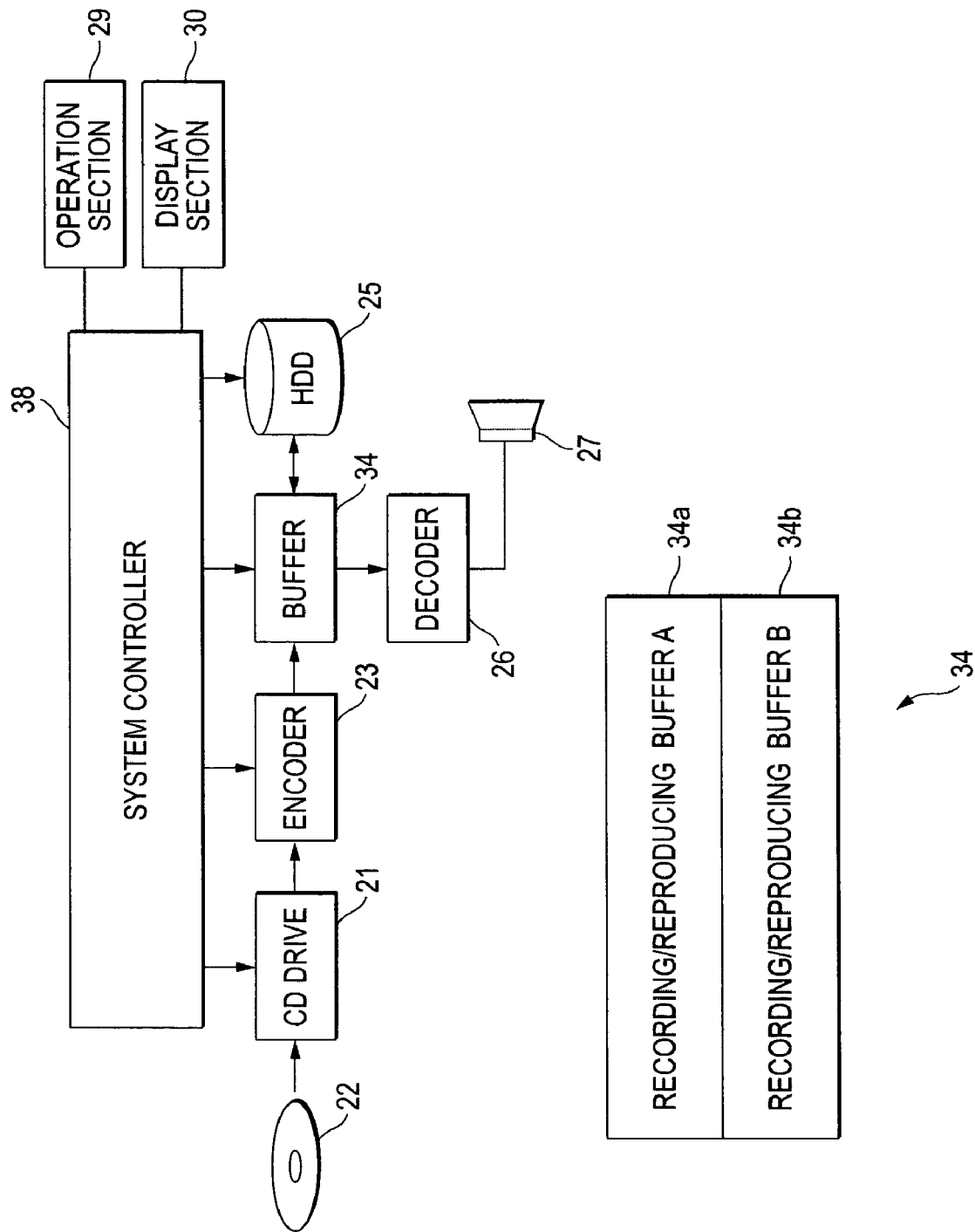
FIG. 11A is a block diagram to schematically show the main part of a recording and reproducing apparatus according to a second embodiment of the invention.
FIG. 11B is a drawing to show a configuration of buffer memory.

FIG. 11A is a block diagram to schematically show the main part of a recording and reproducing apparatus according to a second embodiment of the invention. The recording and reproducing apparatus according to the second embodiment has the same configuration as that previously described with reference to FIG. 1A except buffer memory 24 and system controller 28. Therefore, only the buffer memory and the system controller are denoted by different reference numbers from those in FIG. 1A. In FIG. 11A, numeral 21 denotes the CD drive that can read content (for example, music data) at double speed or more from a storage medium such as a CD 22.

The encoder 23 for performing the compression process is connected to the CD drive 21. The encoder 23 compresses content read by the CD drive 21. The encoder 23 is connected to the HDD 25 and the decoder 26 through a buffer memory 34.

The HDD 25 stores compressed data obtained by the compression process performed by the encoder 23. The decoder 26 performs a decompression process for the compressed data output from the encoder 23 and the compressed data read from the HDD 25. Data obtained by the decompression process performed by the decoder 26 is output from an output section 27 (for example, speaker) through a conversion section (not shown), etc.

The buffer memory 34 temporarily stores the compressed data obtained by the compression process performed by the encoder 23 and transfers the compressed data to the HDD 25 and the decoder 26. The buffer memory 34 also temporarily stores the compressed data read from the HDD 25 and transfers the compressed data to the decoder 26. The data transfer is controlled by a DMA controller (not shown) included in the buffer memory 34 in order to lighten the processing load of a system controller 28 described later.

The buffer memory 34 is divided into a record and a recording/reproducing buffer A 34a and a recording/reproducing buffer B 34b, which is used for recording and reproducing, as shown in FIG. 11B. The recording/reproducing buffer A 34a and the recording/reproducing buffer B 34b each has data capacity equivalent to or more than one piece of music.

The system controller 38 including a CPU, etc., is connected to the CD drive 21, the encoder 23, the buffer memory 34, and the HDD 25; for example, it can control the CD drive 21, thereby extracting (ripping) music data from the CD 22 set in the CD drive 21. The operation section 29 that can be operated by the user and a display section 30 are connected to the system controller 38.

Figure 12:
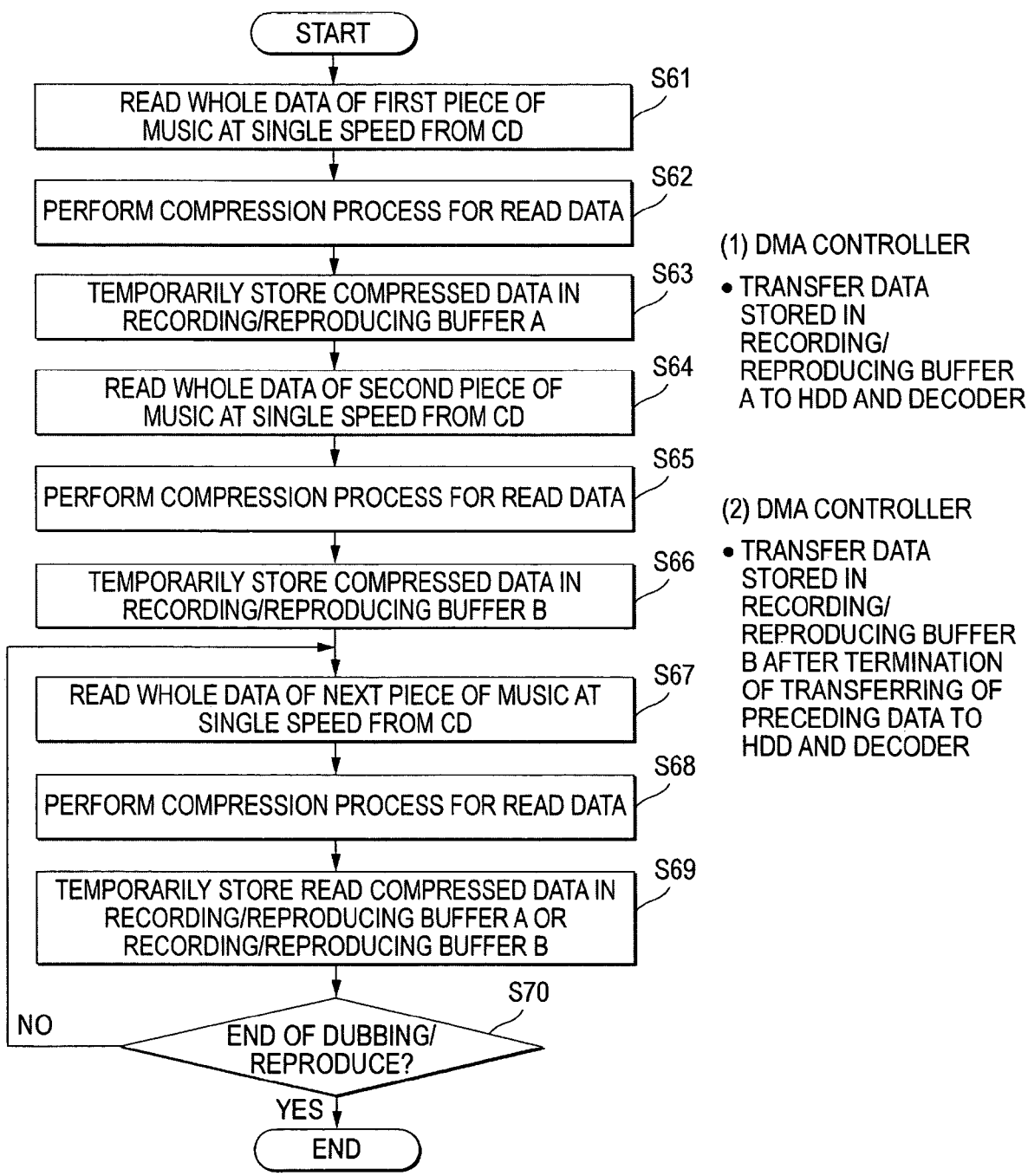
FIG. 12 is a flowchart to show process operation performed by a system controller in the recording and reproducing apparatus according to the second embodiment of the invention.
Figure 13:
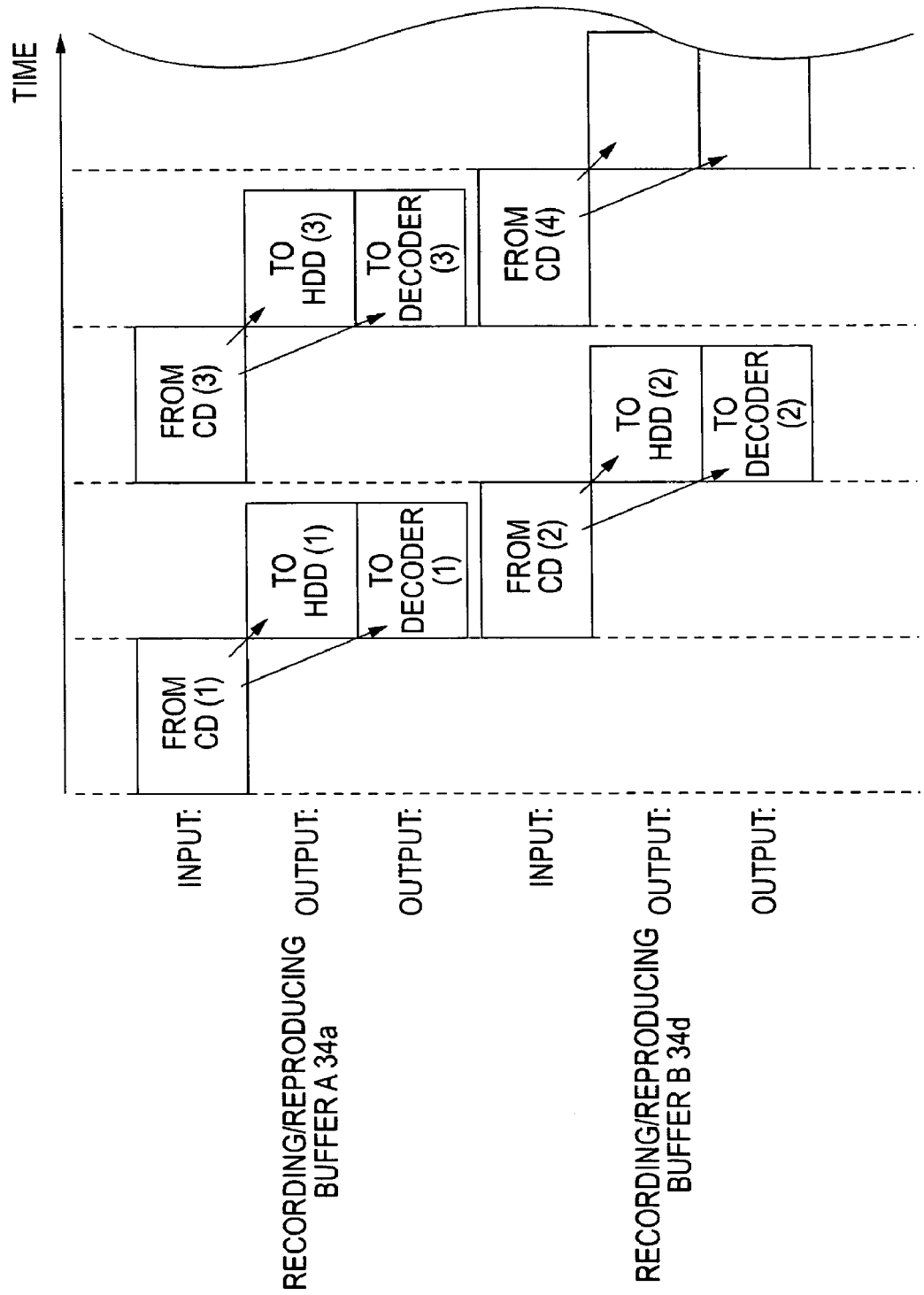
FIG. 13 is a recording/reproducing timing chart in the recording and reproducing apparatus according to the second embodiment of the invention.

Process operation [2-1] performed by the system controller 38 in the recording and reproducing apparatus according to the second embodiment will be discussed with reference to a flowchart of FIG. 12 and a recording/reproducing timing chart of FIG. 13. Process operation [2-1] is performed when the user operates the operation section 29 to select a parallel mode for dubbing a piece of music while reproducing the piece of music.

To begin with, the CD drive 21 is controlled so that the whole music data of a first piece of music is read at single speed from the CD 22 (step S61) and the read music data is compressed in the encoder 23 (step S62). The compressed data obtained by the compression process performed by the encoder 23 is temporarily stored in the recording/reproducing buffer A 34a (step S63).

When compressed data is input into the buffer 34 in a state in which the recording/reproducing buffer A 34a and the recording/reproducing buffer B 34b are empty, the DMA controller included in the buffer memory 34 transfers the input compressed data (compressed data stored in the recording/reproducing buffer A 34a) to the HDD 25 and the decoder 26 at single speed. The compressed data transferred to the decoder 26 is decompressed in the decoder 26 and output from the output section 27, as described above. That is, the data is output as audio.

Next, the whole music data of a second piece of music is read at single speed from the CD 22 (step S64) and the read music data is compressed in the encoder 23 (step S65). The compressed data obtained by the compression process performed by the encoder 23 is temporarily stored in the recording/reproducing buffer B 34b (step S66).

When compressed data is input into the buffer 34 in a state in which the recording/reproducing buffer A 34a is not empty (that is, the recording/reproducing buffer A 34a has data to be transferred to the HDD 25 and the decoder 26), the DMA controller transfers newly input compressed data (compressed data stored in the recording/reproducing buffer B 34b) to the HDD 25 and the decoder 26 at single speed after termination of the transfer of the preceding compressed data (compressed data stored in the recording/reproducing buffer A 34a) to the HDD 25 and the decoder 26.

Next, the whole music data of another piece of music is read at single speed from the CD 22 (step S67) and the read music data is compressed in the encoder 23 (step S68). The compressed data obtained by the compression process performed by the encoder 23 is temporarily stored in the recording/reproducing buffer A 34a or the recording/reproducing buffer B 34b, which is empty (step S69).

Here, the music data of a single piece of music is read and is temporarily stored in the buffer memory 34. However, in another embodiment, using buffer memory having a data capacity equal to or more than one CD, all music data stored in the CD 22 rather than data of a single piece of music may be read collectively and be temporarily stored in the buffer memory. Accordingly, the processing load can be lightened. At the time, it is desirable that information indicating boundary between pieces of music may be stored in the buffer memory.

Next, whether or not the dubbing and reproducing operation of the music data stored on the CD 22 terminates is determined (step S70). If it is not concluded that the dubbing and reproducing operation terminates, music data needs to be read from the CD 22 and then the process returns to step S67. On the other hand, if it is concluded that the dubbing and reproduce operation terminates, music data need not be read from the CD 22 and then process operation [2-1] is terminated.

The recording and reproducing apparatus according to the second embodiment does not require excessive buffer memory 34 because compressed data is adopted and further recording buffer and reproducing buffer are not separate. Thus, an increase in the cost can be suppressed. Since dubbing and reproducing proceed at the same time, the user can easily keep track of what a current piece of music being dubbed is.

Figure 14:
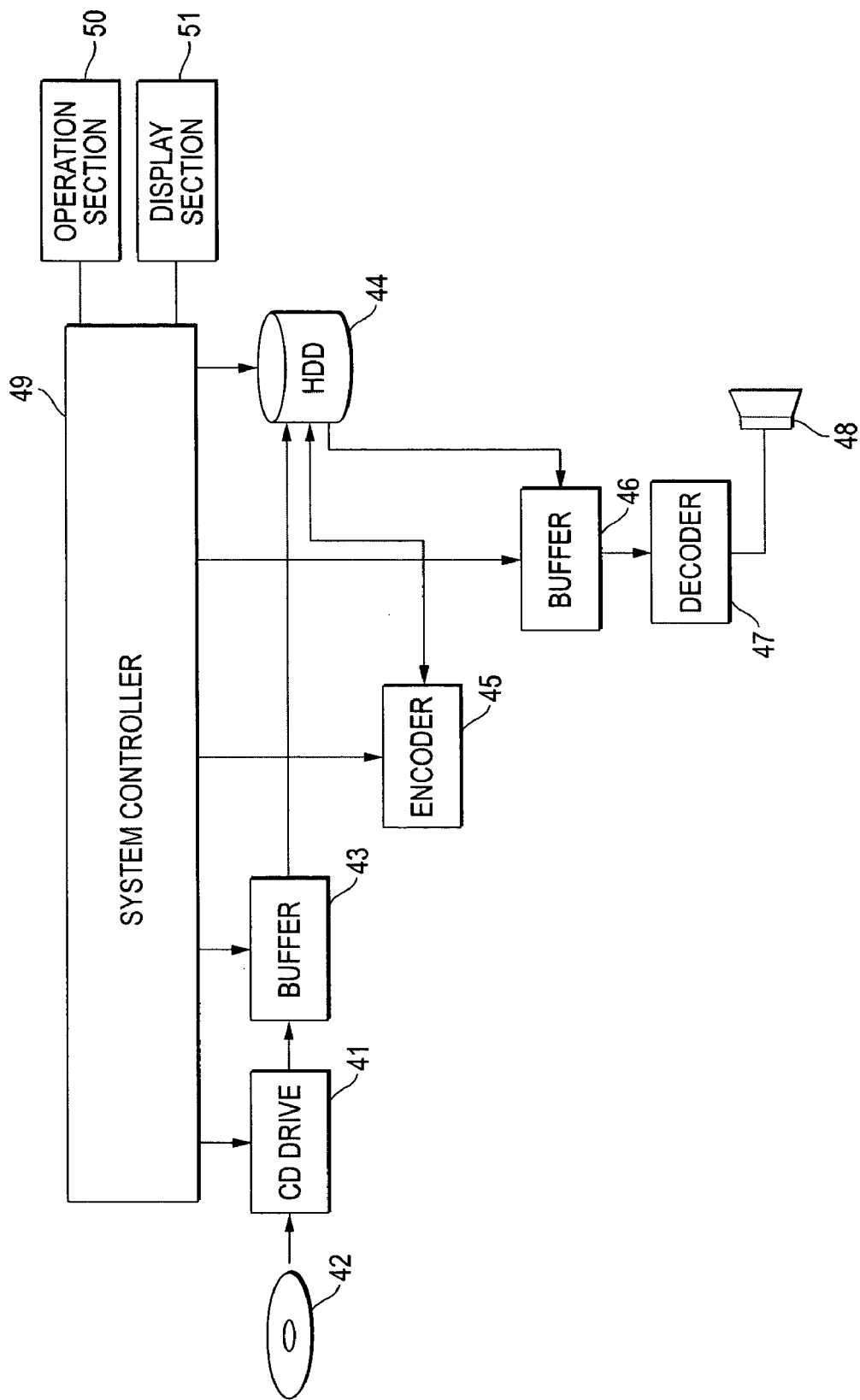
FIG. 14 is a block diagram to schematically show the main part of a recording and reproducing apparatus according to a third embodiment of the invention.

FIG. 14 is a block diagram to schematically show the main part of a recording and reproducing apparatus according to a third embodiment of the invention. In the figure, numeral 41 denotes a CD drive that can read content (for example, music data) at double speed or more from a storage medium such as a CD 42. An HDD 44 is connected to the CD drive 41 through buffer memory 43, and music data read in the CD drive 41 is stored in the HDD 44.

An encoder 45 for performing a compression process is connected to the HDD 44. The encoder 45 compresses music data read from the HDD 44. The compressed data obtained by the compression process performed by the encoder 45 is stored in the HDD 44. After the compressed data is stored, it is preferable that the music data should be deleted from the HDD 44 (to ensure the storage capacity). The HDD 44 is connected to a decoder 47 through buffer memory 46.

The decoder 47 performs a decompression process for the compressed data read from the HDD 44. Data obtained by the decompression process performed by the decoder 47 is output from an output section 48 (for example, speaker) through a conversion section (not shown), etc. The buffer memory 46 temporarily stores the compressed data read from the HDD 44 and transfers the compressed data to the decoder 47.

A system controller 49 including a CPU, etc., is connected to the CD drive 41, the buffer memory 43, the HDD 44, the encoder 45, and the buffer memory 46; for example, it can control the CD drive 41, thereby extracting (ripping) music data from the CD 42 set in the CD drive 41. An operation section 50 that can be operated by the user and a display section 51 are connected to the system controller 49.

According to the recording and reproducing apparatus of the third embodiment, the music data read from the CD 42 is written into the HDD 44 before compression process is performed, and then compression process is performed. Accordingly, high-speed dubbing is made possible regardless of the performance of the encoder 45. This is particularly useful if the user wants to release the storage medium such as the CD 42 early.

Since the music data read from the CD drive 41 is temporarily stored in the buffer memory 43, a dropout (skip), etc., can be prevented. Since the compressed data read from the HDD 44 is temporarily stored in the buffer memory 46, the compressed data from the HDD 44 can be read at any desired speed. If the buffer memory 43, 46 is not adopted, the cost is reduced although the performance of the recording and reproducing apparatus is degraded.

Figure 15:
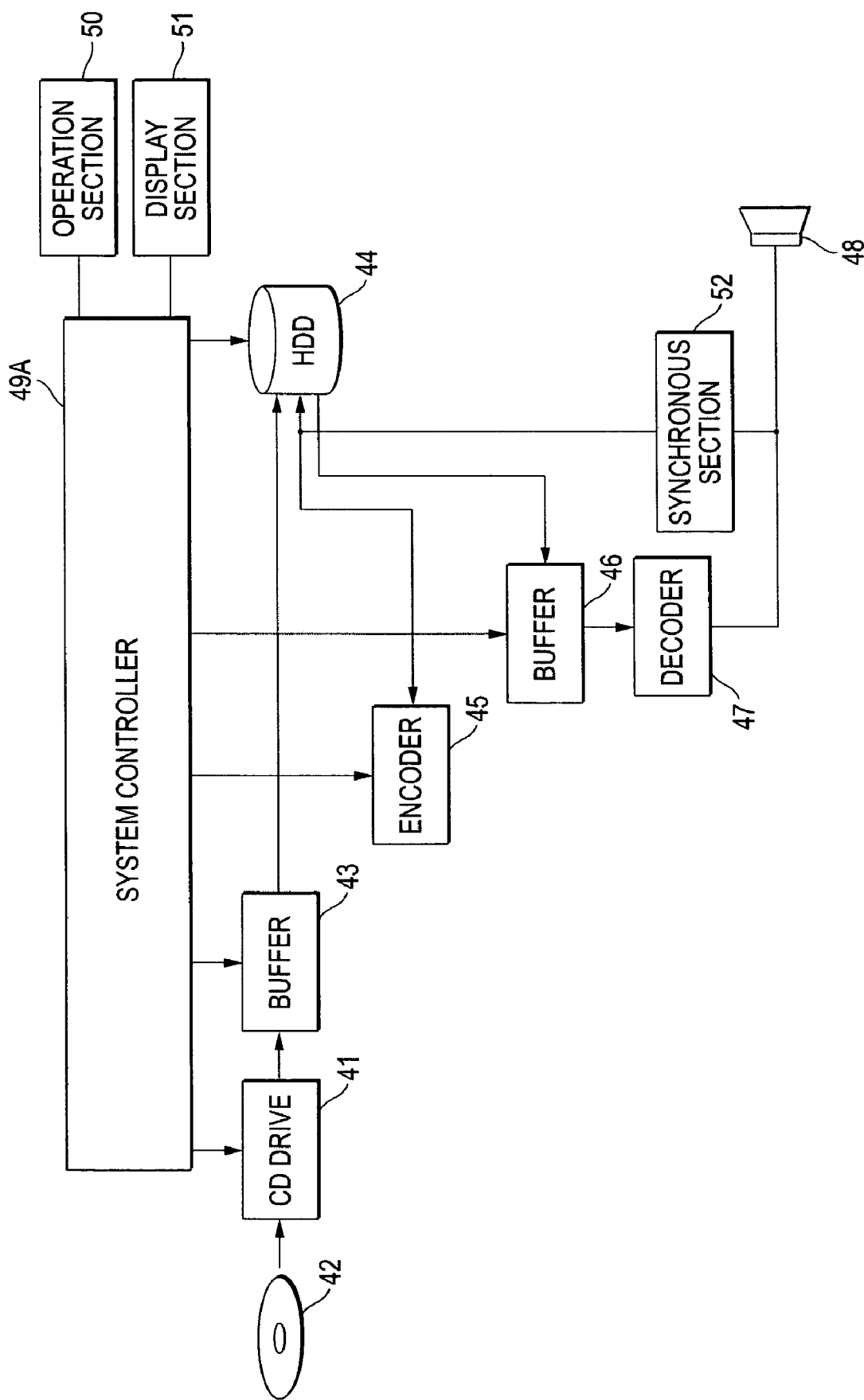
FIG. 15 is a block diagram to schematically show the main part of a recording and reproducing apparatus according to another embodiment of the invention.
Figure 17:
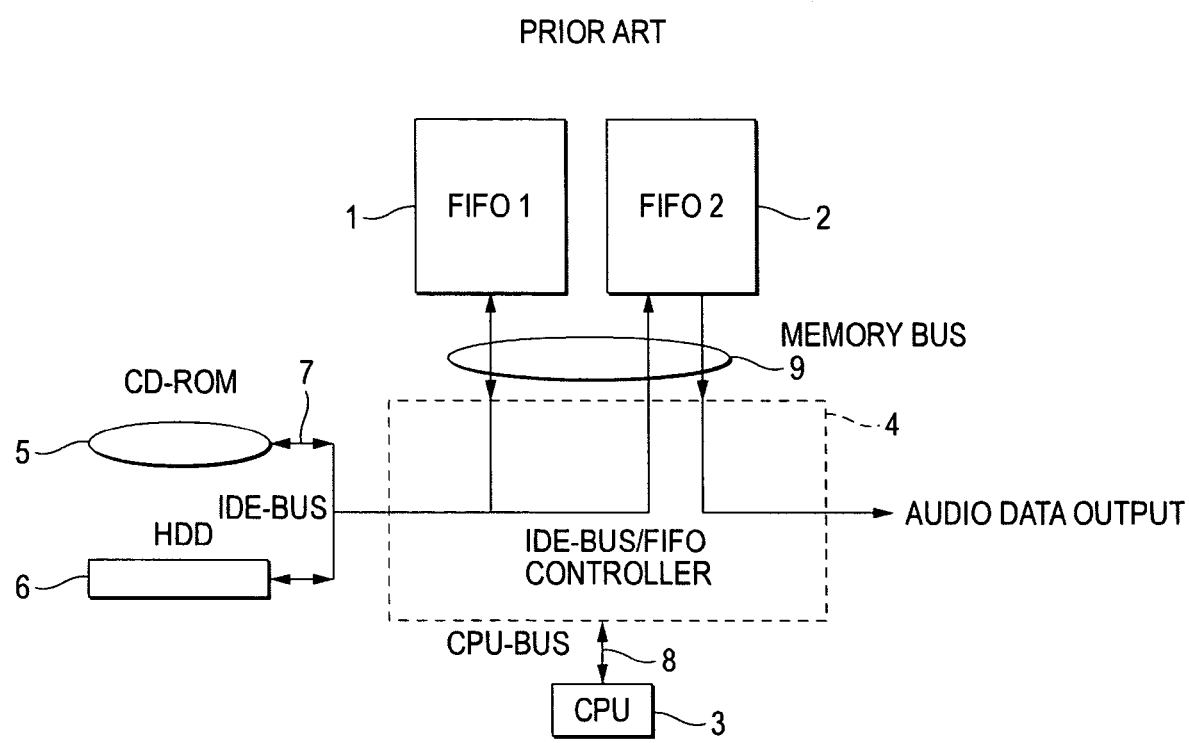
FIG. 17 is a block diagram to schematically show the main part of a recording and reproducing apparatus disclosed in JP-A-2002-203361.
Figure 18:
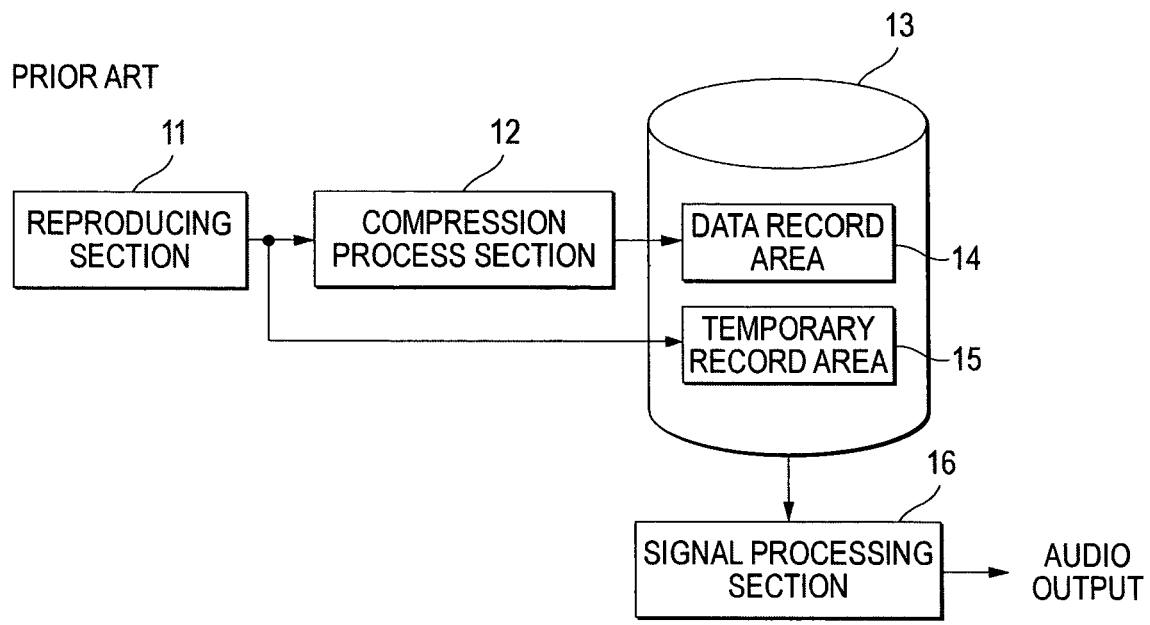
FIG. 18 is a block diagram to schematically show the main part of a recording and reproducing apparatus disclosed in JP-A-2003-228907.
Figure 19:
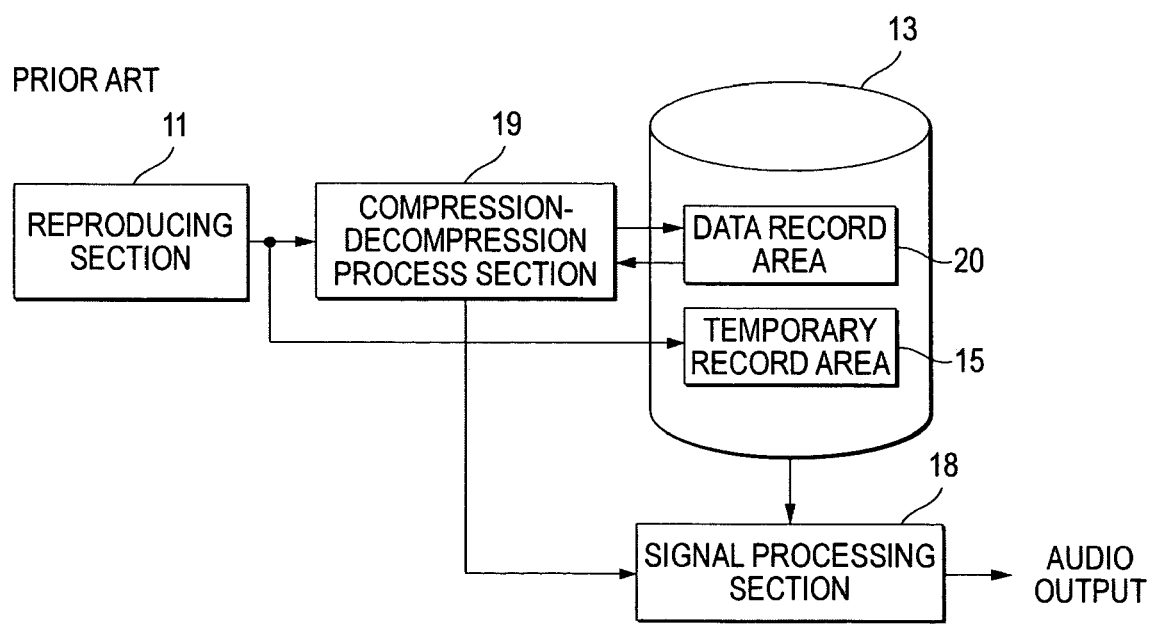
FIG. 19 is a block diagram to schematically show the main part of a recording and reproducing apparatus disclosed in JP-A-2003-228907.

In the description of the recording and reproducing apparatus according to the third embodiment, a piece of music is reproduced using the compressed data read from the HDD 44. However, in another embodiment, a piece of music may be reproduced using music data read from the HDD 44 (namely, uncompressed data) concurrently with compression process of the encoder 45, for example, as shown in FIG. 15.

Also, in the recording and reproducing apparatus according to the first to third embodiments, the compressed data corresponding to pieces of music recorded on the CD 22, 42 is stored in the HDD 25, 44 without any limitation. However, in another embodiment, the compressed data may be stored in the HDD 25, 44 considering a user's request as described below in (1) to (4) based on information input through the operation section 29, 50, for example. The system controller may make determination in (1) to (4).

(1) If it is concluded that the user makes a dubbing request while a piece of music is being reproduced, the compressed data corresponding to the piece of music being reproduced may be stored in the HDD.

(2) If it is concluded that the user makes a dubbing cancel request while a piece of music is being reproduced, the compressed data corresponding to the piece of music being reproduced is not stored in the HDD and only the compressed data corresponding to another piece of music not involved in the dubbing cancel request may be stored in the HDD.

(3) When a piece of music is stored in the HDD before reproducing the piece of music, if it is concluded that the user does not make a dubbing request (or makes a dubbing cancel request) while the piece of music is being reproduced, the compressed data corresponding to the piece of music being reproduced may be deleted from the HDD.

(4) Unlike (1) to (3), pieces of music corresponding to the compressed data already stored in the HDD and pieces of music corresponding to the compressed data to be transferred to the HDD may be displayed on the display section 30, 51 and introduced to the user. The user is allowed to select a piece of music to be stored. The compressed data may be deleted from the HDD or the music data may be transferred to the HDD, based on the selection result.

In still another embodiment, the compressed data corresponding to a piece of music not involved in a user's storing request may be inhibited from being read from the HDD rather than deleted from the HDD. For the management, a method of duplicating a management file is available as shown in FIG. 16; pieces of music that can be read are indicated in a management file F1, and pieces of music whose compressed data is recorded in the HDD are indicated in a management file F2 regardless of whether or not the pieces of music (compressed data) can be read.

If the compressed data is inhibited from being read from the HDD rather than deleted from the HDD, a restoration process of the compressed data can be simplified. For example, the compressed data inhibited from being read can be released from a read inhibition mode by one operation (for example, the management file F1 is made to be the same as the management file F2) or can be released from the read inhibition mode exactly as the user selects. To again dub the same piece of music, the piece of music (compressed data) already recorded in the HDD can be used, so that the dubbing efficiency can be enhanced. Whether or not the same piece of music is recorded in the HDD can be determined based on the management file (containing information concerning pieces of music) recorded in the HDD and TOC information obtained from the CD.

The case where the content is music data has been described so far, but the recording and reproducing apparatus according to the invention is not limited to audio data such as music data, and can also be used for video data. For example, the recording and reproducing apparatus can also record and reproduce video data recorded on a DVD similarly to music data recorded on a CD.

What is claimed is:

1. A recording and reproducing apparatus for reproducing information recorded on a recording medium concurrently while recording the information, the recording and reproducing apparatus comprising:
   a compression section that reads the information recorded on the recording medium and compresses read information;
   a temporary storage section that stores compressed information provided by the compression process, the temporary storage section has a first storage area and a second storage area;
   a reproducing process section that decompresses the compressed information output thereto from the temporary storage section and reproduces decompressed information; and
   a storage section that stores the compressed information output thereto from the temporary storage section, wherein the temporary storage section stores the compressed information output thereto from the storage section, the reproducing process section decompresses the compressed information output from the first storage area of the temporary storage section and the storage section stores the compressed information output from the second storage area of the temporary storage section in parallel.

2. The recording and reproducing apparatus according to claim 1, wherein the temporary storage section has a first area that stores the compressed information to be output to the reproducing process section and a second area that stores the compressed information to be output to the storage section, independently from each other.

3. The recording and reproducing apparatus according to claim 1, wherein the temporary storage section has a first area that stores the compressed information to be output to the reproducing process section and a second area that stores the compressed information to output to the storage section, the first area and the second area being the same area.

4. The recording and reproducing apparatus according to claim 1, wherein a storage capacity of the temporary storage section is equal to or greater than that of the recording medium.

5. The recording and reproducing apparatus according to claim 1, wherein the temporary storage section stores boundary information indicating boundary between pieces of the information.

6. The recording and reproducing apparatus according to claim 1, wherein a storage capacity of the temporary storage section is equal to or greater than one piece of the information stored in the recording medium.

7. The recording and reproducing apparatus according to claim 1, further comprising:
   a fast-forward command section that issues a fast-forward command for fast forwarding the information, wherein:
   the reproducing process section decompresses the compressed information stored in the temporary storage section at a speed faster than a normal speed and reproduces decompressed information at the speed faster than the normal speed, when the fast forward command is issued from the fast forward command section during a period in which the compressed information output from the temporary storage section is being stored in the storage section.

8. The recording and reproducing apparatus according to claim 7, wherein the normal speed is equal to a single speed.

9. The recording and reproducing apparatus according to claim 1, further comprising:
   a repeat reproducing command section that issues a repeat reproducing command for reproducing information repeatedly, wherein:
   when the repeat reproducing command section issues the repeat reproducing command, the reproducing process section reads the compressed information corresponding to a head portion of the information indicated by the repeat reproducing command, decompresses the read information, and reproduces the decompressed information.

10. The recording and reproducing apparatus according to claim 1, further comprising:
    a rewinding command section that issues a rewinding command for rewinding the information, wherein:
    the reproducing process section decompresses in a reverse direction the compressed information stored in the temporary storage section and reproduces decompressed information, when the rewinding command is issued from the rewinding command section during a period in which the compressed information output from the temporary storage section is being stored in the storage section.

11. The recording and reproducing apparatus according to claim 1, further comprising:
a repeat reproducing command section that issues a repeat reproducing command for reproducing the information repeatedly, wherein:
the reproducing process section decompresses the compressed information stored in the temporary storage section with starting from a top of the compressed information, when the repeat reproducing command is issued from the repeat reproducing command section during a period in which the compressed information output from the temporary storage section is being stored in the storage section.

12. The recording and reproducing apparatus according to claim 1 further comprising:
a selection reproducing command section that issues a selection reproducing command, wherein:
the reproducing process section reads compressed information indicated by the selection reproducing command from the storage section, stores the read compressed information in the temporary storage section, decompresses the compressed information stored in the temporary storage section, and reproduces the decompressed information when the selection reproducing command is issued from the selection reproducing command section during a period in which the compressed information output from the temporary storage section is being stored in the storage section.

13. The recording and reproducing apparatus according to claim 1, further comprising:
a recording command section that issues a recording command for recording information being reproduced into the storage section, wherein:
when the recording command is issued from the recording command section during a period in which information is being reproduced, the compressed information corresponding to the information being reproduced is stored in the storage section.

14. The recording and reproducing apparatus according to claim 1, further comprising:
a selecting command section that selects information to be recorded in the storage section from among the information recorded in the recording medium, wherein:
information selected through the selecting command section is stored in the storage section.

15. The recording and reproducing apparatus according to claim 1, further comprising:
a recording cancel command section that issues a recording cancel command for canceling recording information, wherein:
when the recording cancel command is issued from the recording cancel command section during a period in which the compressed information is being stored in the storage section, the compressed information corresponding to information, which is being reproduced, is not stored in the storage section.

16. The recording and reproducing apparatus according to claim 1, wherein an amount of the compressed information transferred from the storage section to the temporary storage section in a beginning of storing the compressed information in the temporary storage section is smaller than that at a subsequent time.

17. The recording and reproducing apparatus according to claim 16, wherein the amount of the compressed information transferred from the storage section to the temporary storage section increases gradually.

18. A recording and reproducing apparatus for reproducing information recorded on a recording medium concurrently while recording the information, the recording and reproducing apparatus comprising:
a compression section that reads the information recorded on the recording medium and compresses read information;
a temporary storage section that stores compressed information provided by the compression process;
a reproducing process section that decompresses the compressed information output thereto from the temporary storage section and reproduces decompressed information; and
a storage section that stores the compressed information output thereto from the temporary storage section, wherein the temporary storage section stores the compressed information output thereto from the storage section;
a recording request command section that issues a recording request command for recording each piece of information in the storage section; and
a releasing control section that deletes or inhibits compressed information corresponding to information, for which the recording request command has not been issued, from the storage section or from being read from the storage section.

19. The recording and reproducing apparatus according to claim 18 further comprising:
a read inhibition releasing command section that issues a read inhibition releasing command for releasing a state where the information is inhibited from being read from the storage section; and
a releasing control section that release the state where the information is inhibited from being read from the storage section when the read inhibition releasing command is issued from the read inhibition release command section.

20. A recording and reproducing apparatus having a reproducing function of reproducing information recorded on a recording medium and a recording function of recording the information into a storage section, the recording and reproducing apparatus comprising: a compression section that compresses the information recorded in the storage section; a recording control section that stores the compressed information provided by the compression section in the storage section; a reproducing process section that decompresses the compressed information stored in the storage section and reproduces decompressed information, wherein the reproducing process section reproduces uncompressed information recorded in the storage section while the compression section is compressing the information; and a temporary storage section that stores compressed information provided by the compression process, wherein the temporary storage section stores the compressed information output thereto from the storage section.

21. The recording and reproducing apparatus according to claim 20, further comprising:
an uncompressed information storage section that temporarily stores the uncompressed information to be recorded in the storage section.

22. The recording and reproducing apparatus according to claim 20, further comprising:
a compressed information temporary storage section that temporarily stores the compressed information.

* * * * *